(12) United States Patent
Fujiki et al.

(10) Patent No.: US 8,970,360 B2
(45) Date of Patent: Mar. 3, 2015

(54) APPARATUS FOR PROMOTING IMPROVEMENT OF DRIVING SKILL TO IMPROVE FUEL EFFICIENCY

(75) Inventors: Yuji Fujiki, Wako (JP); Hideharu Takemoto, Wako (JP); Keiji Enomoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 823 days.

(21) Appl. No.: 13/121,330

(22) PCT Filed: Sep. 17, 2009

(86) PCT No.: PCT/JP2009/004699
§ 371 (c)(1),
(2), (4) Date: May 13, 2011

(87) PCT Pub. No.: WO2010/035442
PCT Pub. Date: Apr. 1, 2010

(65) Prior Publication Data
US 2011/0205043 A1      Aug. 25, 2011

(30) Foreign Application Priority Data

Sep. 29, 2008   (JP) ................................. 2008-251805

(51) Int. Cl.
| | | |
|---|---|---|
| *B60Q 1/00* | (2006.01) | |
| *G09B 19/16* | (2006.01) | |
| *G01D 7/00* | (2006.01) | |
| *G01D 7/04* | (2006.01) | |

(Continued)

(52) U.S. Cl.
CPC .............. *G09B 19/167* (2013.01); *B60W 40/09* (2013.01); *F02D 11/10* (2013.01); *G01D 7/00* (2013.01); *G01D 7/04* (2013.01); *G07C 5/0825* (2013.01); *G07C 5/085* (2013.01); *B60K 2350/1092* (2013.01)
USPC .......................... 340/439; 340/438; 340/425.5

(58) Field of Classification Search
USPC ........................................ 340/425.5, 438–439
See application file for complete search history.

(56) References Cited

U.S. PATENT DOCUMENTS

| | | | |
|---|---|---|---|
| 6,601,442 B1 | 8/2003 | Decker et al. | |
| 7,024,306 B2 * | 4/2006 | Minami et al. ................ | 701/123 |

(Continued)

FOREIGN PATENT DOCUMENTS

| | | |
|---|---|---|
| EP | 1780393 | 5/2007 |
| JP | 2001-236054 | 8/2001 |

(Continued)

*Primary Examiner* — James Yang
(74) *Attorney, Agent, or Firm* — Rankin, Hill & Clark LLP

(57) ABSTRACT

An apparatus for performing a display indicating a state of fuel efficiency of a vehicle according to a driving operation, detects an operating state of the vehicle according to a driving operation performed by a driver of the vehicle. A score for representing the state of fuel efficiency of the vehicle according to the driving operation is determined. Here, the score is allocated to correspond to the operating state. A display indicating the score is performed as the display indicating the state of fuel efficiency. The allocation of the score to the operating state of the vehicle is changed according to a value obtained by accumulating the score. For example, the allocation of the score to the operating state is changed such that the score is lower as the value obtained by accumulating the score is higher. Thus, a degree of strictness with which the score is marked is higher as the level of the driving skill represented by the accumulated value is higher.

11 Claims, 22 Drawing Sheets

(51) Int. Cl.
*G07C 5/08* (2006.01)
*B60W 40/09* (2012.01)
*F02D 11/10* (2006.01)

(56) References Cited

U.S. PATENT DOCUMENTS

2005/0021222 A1  1/2005  Minami et al.
2005/0096836 A1* 5/2005  Minami et al. ................ 701/123
2007/0027593 A1* 2/2007  Shah et al. ..................... 701/30
2007/0150139 A1  6/2007  Hardy
2007/0239322 A1* 10/2007 McQuade et al. ............... 701/1
2010/0063725 A1* 3/2010  Miura et al. ................... 701/207

FOREIGN PATENT DOCUMENTS

| JP | 2003-328845 | 11/2003 |
| JP | 2003-331380 | 11/2003 |
| JP | 2007233122  | 9/2007  |

* cited by examiner

US 8,970,360 B2

APPARATUS FOR PROMOTING IMPROVEMENT OF DRIVING SKILL TO IMPROVE FUEL EFFICIENCY

FIELD OF INVENTION

The present invention relates to an apparatus for promoting improvement of driving skill to improve the fuel efficiency.

BACKGROUND ART

Recently, consciousness of users regarding the fuel efficiency is increased. There is a tendency to prefer fuel-efficient driving. The fuel efficiency of a vehicle is typically expressed by a travel distance per unit amount of fuel consumption. Japanese Patent Application Laid-Open No. 2001-236054 discloses a technique for displaying instantaneous fuel consumption and average fuel consumption in the form of bar graph as information regarding the fuel consumption.

DISCLOSURE OF THE INVENTION

Problems to be Solved by the Invention

The above technique can inform a driver of a current state of fuel efficiency. However, such "information" is just, notification of the current state of fuel efficiency. Even if the driver, receives such notification, the driver does not understand how to drive the vehicle so as to improve the fuel efficiency. It is difficult that only such notification leads to improvement of the driving skill for improving the fuel efficiency.

Accordingly, there is a demand for a technique capable of promoting improvement of driver's driving skill so as to implement a more fuel-efficient driving.

SUMMARY OF THE INVENTION

In accordance with an aspect of the invention, an apparatus for performing a display indicating a state of fuel efficiency of a vehicle according to a driving operation is provided. The apparatus detects an operating state of the vehicle according to a driving operation performed by a driver of the vehicle. A score that represents a state of fuel efficiency of the vehicle according to the driving operation is determined. Here, the score is allocated to correspond to the operating state, of the vehicle. A display indicating the score is performed as the display indicating the state of fuel efficiency. The allocation of the score to the operating state of the vehicle is changed according to a value obtained by accumulating the score.

According to this invention, the allocation of the score to the operating state of the vehicle is changed according to a value obtained by accumulating the score representing the state of fuel efficiency. Therefore, a degree of strictness with which the fuel efficiency is graded (marked) can be changed according to the accumulated score. Here, it can be said that the value obtained by accumulating the score representing the state of fuel efficiency reflects a level of driver's driving skill regarding the fuel efficiency. Therefore, the degree of strictness with which the fuel efficiency is graded can be changed according to the driver's driving skill. By performing a display indicating the score thus graded, the driver can be encouraged to further improve the driving skill.

For example, in a case where a higher accumulated score indicates a more fuel-efficient driving operation, the allocation can be made such that a stricter score is determined as the accumulated score increases. A driver is required to obtain a higher level of driving skill in order to prevent the reduction of the score. As a result, the improvement of driver's driving skill can be promoted.

Other features and advantages of the invention will become apparent from the following detailed description.

DETAILED DESCRIPTION OF THE INVENTION

Figure 1:
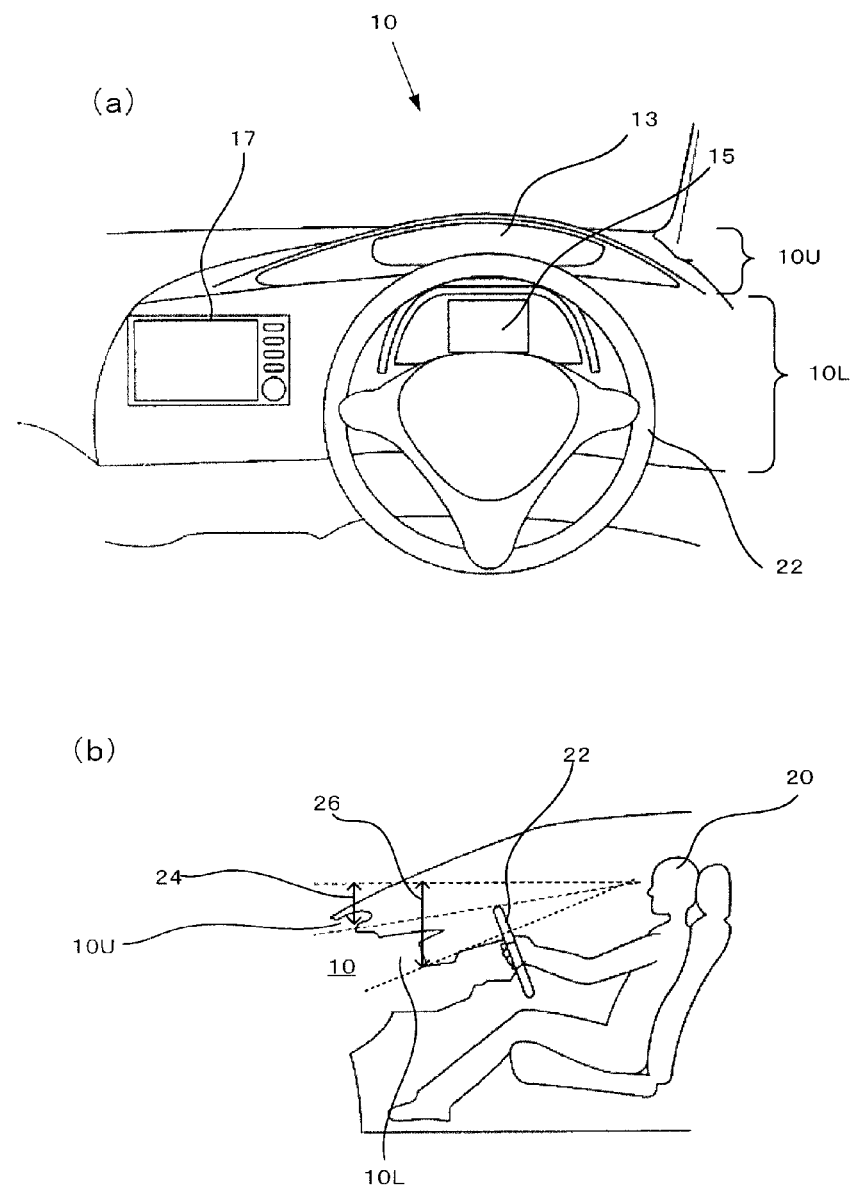
FIG. 1 illustrates a layout of display units and a display apparatus on an instrument panel according to an embodiment of the invention.

An exemplary embodiment of the invention will be described below with reference to the drawings.

[Display Form]

Display forms according to an embodiment of the invention, which is capable of coaching a driver for the driving operation so as to further improve the fuel efficiency, will be described with reference to FIGS. 1 to 3.

FIG. 1(a) schematically shows an instrument panel 10 of a vehicle when the instrument panel 10 is viewed from a driving seat. FIG. 1(b) schematically shows the instrument panel 10 when the instrument panel 10 is viewed from the side of the driving seat. In this embodiment, the instrument panel 10 is a two-tier panel consisting of an upper level 10U and a lower level 10L. A first display unit 13 is provided in the upper level 10U. A second display unit 15 is provided in the lower level 10L.

As shown in FIGS. 1(a) and 1(b), when a driver 20 is seated in the driving seat, it appears to the driver 20 that the upper level 10U is located above a steering wheel 22. Accordingly, the driver 20 can visually recognize the first display unit 13 in the upper level 10U without being interrupted by the steering wheel 22. As shown in FIG. 1(b), the distance from a viewpoint of the driver to the upper level 10U is longer than to the lower level 10L. That is, the upper level 10U is arranged at a position that is closer to the front side of the vehicle as compared to the lower level 10L. Here, an arrow 24 indicates an amount of movement of driver's line-of-sight for visually recognizing the upper level 10U when the driver 20 drives the vehicle while seeing the front view. An arrow 26 indicates an amount of movement of driver's line-of-sight for visually recognizing the lower level 10L when the driver 20 drives the vehicle while seeing the front view. As is clear from a comparison of the arrows 24 and 26, the arrangement of the upper level 10U enables the driver 20 to visually recognize the first display unit 13 in the upper level 10U with the amount of movement of line-of-sight less than the amount of movement of line-of-sight for the second display unit 15 in the lower level 10L.

Alternatively, instead of using the above two-tier instrument panel 10, the first and second display units 13 and 15 may be provided in any positions such that the driver can visually recognize the first and second display units 13 and 15 during driving of the vehicle.

In this embodiment, a display apparatus 17 is provided on the left side of the driver 20 in the lower level 10L of the instrument panel 10. In this embodiment, the display apparatus 17 comprises a touch panel. Various pieces of information can be displayed on the display apparatus 17. In this embodiment, a navigation system is mounted on the vehicle, and pieces of information such as map information provided from the navigation system are displayed on the display apparatus 17.

FIG. 2(a) shows a display example on the first display unit 13 of FIG. 1. FIG. 2(b) shows a display example on the second display unit 15 of FIG. 1. The first and second display units 13 and 15 can be implemented by any appropriate display device. For example, the first and second display units 13 and 15 may be implemented by a liquid crystal display device.

The first display unit 13 displays information 31 indicating an operating state of the vehicle. In this embodiment, the information 31 is a vehicle speed. That is, the first display unit 13 acts as a speed meter. However, the information 31 to be displayed is not limited to the vehicle speed. The information 31 may be other information (such as an engine rotational speed of the vehicle).

The first display unit 13 is configured such that a background color 33 of the displayed information 31 is changeable between a first color and a second color. In this embodiment, the first color is green and the second color is blue. The invention is not limited to such color arrangement. The change of the color can be implemented by any technique. For example, Light Emitting Diodes (LEDs) for the first color and an LED for the second color are provided as light sources in the rear of the display screen of the first display unit 13. The color can be changed between the first color and the second color by a well-known gradation control (for example, an intensity of each LED can be controlled by a PWM control).

The first color is, established as a color representing a fuel-efficient driving operation. The second color is established as a color representing a fuel-inefficient driving operation. Here, the fuel efficiency is deteriorated when a driving operation such as a sudden acceleration, a sudden deceleration, and an excessively high vehicle speed is performed. Therefore, the first color is established as a color representing a driving operation that does not lead to a sudden acceleration, a sudden deceleration, or an excessively high vehicle speed. Because such a driving operation can be said as a safer operating state, the first color can be said as a color representing a safer driving operation compared to the second color.

The background color 33 is changed according to a state of fuel efficiency in response to a driver's operation for driving, the vehicle and/or a driver's operation for braking the vehicle.

In this embodiment, the operation for driving the vehicle (hereinafter referred to as an accelerator operation) includes an operation for driving the vehicle at a constant speed and an operation for accelerating the vehicle. Accordingly, the accelerator operation includes not only an operation by the driver on an accelerator pedal but also an operation for causing a controller mounted on the vehicle to drive the vehicle in response to some operation by the driver. For example, in a case where an automatic cruise controller by which the vehicle automatically travels at a constant speed without operation on the accelerator pedal is mounted on the vehicle, the accelerator operation also includes performing a constant-speed traveling control by activating the automatic cruise controller through, for example, a switch operation.

In this embodiment, the operation for braking the vehicle (hereinafter referred to as a brake operation) indicates an operation for decelerating the vehicle. Accordingly, the brake operation includes not only an operation by the driver on a brake pedal but also an operation for decelerating the vehicle by, for example, activating an engine brake.

In the description, the term "driving operation" is used for the accelerator operation and the brake operation performed by a driver.

The background color 33 is controlled such that the color gets closer to the first color as the driving operation is determined as being more fuel-efficient, and the color gets closer to the second color as the driving operation is determined as being less fuel-efficient. Therefore, a driver can confirm whether his/her driving operation is fuel-efficient by visually recognizing the background color 33. Further, the driver can learn the driving operation for improving the fuel efficiency by paying attention to his/her driving operation such that the background color 33 is not brought close to the second color.

Because the driving operation determined as being fuel-efficient is a driving operation where a sudden acceleration, a sudden deceleration, or an excessively high vehicle speed is not generated as described later, the driver can perform a safer driving operation by paying attention to his/her driving operation such that the background color 33 is not brought close to the second color.

As described above, in this embodiment, because the first display unit 13 is provided in the upper level 10U of the instrument panel 10, the driver can visually recognize the first display unit 13 with less amount of movement of line-of-sight when the driver drives the vehicle while seeing in front of the vehicle. Because the driver visually recognizes the background color 33 with ease, the driver can more easily evaluate his/her driving operation from the viewpoint of fuel efficiency.

The second display unit 15 has a score display region 35 in an upper portion and a coaching display region 37 in a lower portion. Although described in detail later, the score display region 35 is a region where a score (point) obtained by evaluating the driving operation from the viewpoint of fuel efficiency is displayed. In this embodiment, the score value is expressed by the number of "leaves". The number of leaves is five in the example of the figure. As the score is higher, the number of displayed leaves is increased. A higher score indicates that a fuel-efficient driving operation is continuously performed.

The coaching display region 37 has an accelerator region Ar in the right side and a brake region Br in the left side with respect to a reference position R. A bar 39 is provided at the reference position R, and is extensible toward the accelerator region Ar and brake region Br. The accelerator region Ar is a region used for the accelerator operation (an operation for driving the vehicle as described above). The brake region Br is a region used for the brake operation (an operation for braking the vehicle as described above).

The accelerator region Ar is divided into a region that is not hatched (referred to as a non-hatched region) or an accelerator first region Ar1, and a region that is hatched (referred to as a hatched region) or an accelerator second region Ar2. As with the accelerator region Ar, the brake region Br is divided into a non-hatched region or a brake first region Br1, and a hatched region or a brake second region Br2.

In this embodiment, the length of the accelerator first region Ar1 is equal to the length of the accelerator second region Ar2 in the horizontal axis direction. The length of the brake first region Br1 is equal to the length of the brake second region Br2 in the horizontal axis direction. However, for any of the accelerator region Ar and the brake region Br, the length of the first region may differ from the length of the second region in the horizontal axis direction.

In both the accelerator region Ar and the brake region Br, the first region is established as a region representing a fuel-efficient driving operation, and the second region is established as a region representing a fuel-inefficient driving operation. Here, as described above, the fuel efficiency is deteriorated when a driving operation such as a sudden acceleration, a sudden deceleration, and an excessively high vehicle speed is performed. Therefore, the first region is established as a region representing a driving operation, where a sudden acceleration, a sudden deceleration, or an excessively high vehicle speed is not generated. Because such a driving operation is safer, the first region can be said as a region representing a safer driving operation.

A length of the bar 39 extending from the reference position R is changed according to a state of fuel efficiency in response to the accelerator operation and brake operation.

The length of the bar 39 is controlled such that it is shorter as the state of fuel efficiency of the driving operation is determined as; being, better. Therefore, a driver can confirm whether his/her diving operation is fuel-efficient by visually recognizing the length of the bar 39. Further, the driver can learn the driving operation for improving the fuel efficiency by paying attention to his/her driving operation such that the tip of the bar 39 is not brought close to the second region. Because the driving operation determined as being fuel-efficient is a driving operation where a sudden acceleration, a sudden deceleration, or an excessively high vehicle speed is not generated as described later, the driver can perform a safer driving operation by paying attention to his/her driving operation such that the tip of the bar 39 is not brought close to the second region.

Further, the accelerator region Ar and the brake region Br are separately provided, and the bar 39 extends in different directions between the accelerator operation and brake; operation. Therefore, a driver can individually and visually evaluate his/her accelerator operation and brake operation with ease. As a result, the driver can easily learn the driving operation for improving the fuel efficiency for each of the accelerator operation and brake operation.

In this embodiment, the right side with respect to the reference position R is used for the accelerator operation while the left side is used for the brake operation. Alternatively, the left side with respect to the reference position R may be used for the accelerator operation while the right side may be used for the brake operation.

In this embodiment, the first and second regions are distinguished from each other by the presence or absence of hatching. However, the present invention is not limited to such hatching as long as a driver can visually distinguish between the first and second regions. For example, the first and second regions may be visually distinguished from each other by coloring, or by drawing a line at a boundary between the first and second regions.

In this embodiment, the accelerator region Ar and the brake region Br are provided in the left and right directions with respect to the reference position R. However, the invention is not limited to the left and right directions. Other directions may be used. For example, the accelerator region Ar may be provided upward from the reference position R while the brake region Br may be provided downward.

Further, the bar 39 may be any graphics whose length is variably changed. The bar 39 is not limited to the shape shown in the figure, and may be implemented by any shape. For example, an arrow, a solid line, a dotted line, or a triangle (such as an isosceles triangle having a base in the reference position) may be used as the displayed graphics. The size of the graphics may be arbitrarily determined. The shape and/or color of the graphics may differ between a case where the bar 39 extends toward the accelerator region Ar and a case where the bar 39 extends toward the brake region Br.

Further, the coaching display region 37 is not limited to the square shape in the figure. The coaching display region 37 may have any shape. For example, a position at which a semi-circle is divided into two quadrants is set as the reference position R. One quadrant may be used as the accelerator region Ar while the other quadrant may be used as the brake region Br. The bar 39 may be configured to extend in a curve parallel to the circumference from the reference position R toward the accelerator region Ar and brake region Br.

As described above, both the background color 33 of the first display unit 13 and the length of the bar 39 of the second display unit 15 can cause a driver to recognize whether his/her accelerator operation and brake operation are fuel efficient.

That is, the background color 33 of the first display unit 13 and the length of the bar 39 of the second display unit 15 cooperate with each other. This cooperation will be described with reference to FIG. 3, where the right side of the figure shows the display on the first display unit 13, and the left side of the figure shows the display of the coaching display region 37 on the second display unit 15. Changes in the background color of the first display unit 13 are expressed by differences in the kind of hatching.

State (A) indicates a state where the vehicle is cruising. For example, this state is implemented by a driver slightly depressing the accelerator pedal. In the figure, the vehicle speed of 60 kilometers per hour is displayed, which is an example. The bar 39 extends rightward because the accelerator operation is performed. The driving operation is determined as being fuel-efficient, and hence the bar 39 extends to be within the accelerator first region Ar1 that is the non-hatched region. By visually recognizing that the bar 39 is within the non-hatched region, a driver can recognize that his/her accelerator operation is a low fuel consumption and safer driving operation. Because the driving operation is determined as being a fuel-efficient accelerator operation, the background color 33 of the first display unit 13 is the first color (in the embodiment, green). By visually recognizing that the background color 33 of the first display unit 13 is the first color, a driver can recognize that his/her accelerator operation is a low fuel consumption and safer driving operation.

State (B) indicates a state where a braking force on the vehicle is small. For example, this state is implemented by a driver slightly depressing the brake pedal. The bar 39 extends leftward because the brake operation is performed. The driving operation is determined as being fuel efficient, and hence the bar 39 extends to be within the brake first region Br1 that is the non-hatched region. By visually recognizing that the bar 39 is within the non-hatched region, a driver can recognize that his/her brake operation is a low fuel consumption and safer driving operation. Because the driving operation is determined as a fuel-efficient brake operation, the background color 33 of the first display unit 13 is the first color as with the state (A). By visually recognizing that the background color 33 is the first color, a driver can recognize that his/her brake operation is a low fuel consumption and safer driving operation.

State (C) indicates a state where the vehicle is moderately accelerated. For example, this state is, implemented when the amount of depressing the accelerator pedal is greater than that of the state (A). In the figure, the vehicle speed of 60 kilometers per hour is displayed, which is an example. The bar 39 extends rightward because the accelerator operation is performed. Although the state of fuel efficiency is deteriorated (that is, the fuel consumption is increased) as compared to the state (A), the accelerator operation is determined as a fuel-efficient driving operation and is not determined as reaching a fuel-inefficient driving operation. Therefore, the bar 39 extends to be within the accelerator first region Ar1 that is the non-hatched region. However, the bar 39 becomes longer than that of the state (A). By visually recognizing that the bar 39 is within the non-hatched region, a driver can recognize that his/her accelerator operation is a relatively low fuel consumption. Further, because it is determined that the state of fuel efficiency is deteriorated as compared to the state (A), the background color 33 of the first display unit 13 becomes an intermediate color (in this embodiment, a mixed color of green and blue (blue green)) between the first color and the second color (in this embodiment, blue). By visually recognizing that the background color 33 is the intermediate color, a driver can recognize that his/her accelerator operation is a relatively low fuel consumption.

State (D) indicates a state where the vehicle is moderately decelerated. For example, this state is implemented when the amount of depressing the brake pedal is greater than that of the state (B). The bar 39 extends leftward because the brake operation is performed. Although the state of fuel efficiency is deteriorated (that is, the fuel consumption is increased) as compared to the state (B), the brake operation is determined as a fuel-efficient driving operation, and is not determined as reaching a fuel-inefficient driving operation. Therefore, the bar 39 extends to be within the brake first region Br1 that is the non-hatched region. However, the bar 39 becomes longer than that of the state (B). By visually recognizing that the bar 39 is within the non-hatched region, a driver can recognize that his/her brake operation is a relatively low fuel consumption. Further, because it is determined that the state of fuel efficiency is deteriorated as compared to the state (B), the background color 33 of the first display unit 13 becomes an intermediate color (as described, above, a mixed color of green and blue (blue green) in this embodiment) between the first color and the second color, in a similar way to the state (C). By visually recognizing that the background color 33 is the intermediate color, a driver can recognize that his/her brake operation is a relatively low fuel consumption.

State (E) indicates a state where the vehicle; is suddenly accelerated. For example, this state is implemented when the amount of depressing the accelerator pedal is greater than that of the state (C). It is noted that the vehicle speed value of the first display unit 13 in the figure corresponds to an example for the case (F), and does not correspond to the case (E) where a sudden acceleration is performed. The bar 39 extends rightward because the accelerator operation is performed. The state of fuel efficiency is deteriorated (that is, the fuel consumption is increased) as compared to the state (C). The accelerator operation is determined as a fuel-inefficient driving operation. As a result; the bar 39 becomes longer than that of the state (C) to enter the accelerator second region Ar2 that is the hatched region. By visually recognizing that the bar 39 extends into the hatched region, a driver can recognize that his/her accelerator operation deteriorates the fuel efficiency. Further, because the accelerator operation is determined as a fuel-inefficient driving operation, the background color 33 of the first display unit 13 is the second color (in this embodiment, blue). By visually recognizing that the background color 33 is the second color, a driver can recognize that his/her accelerator operation deteriorates the fuel efficiency.

State (F) indicates a state where the vehicle is suddenly decelerated. For example, this state is implemented when the amount of depressing the brake pedal is greater than that of the state (D). The bar 39 extends leftward because the brake operation is performed. The state of fuel efficiency is deteriorated (that is, the fuel consumption is increased) as compared to the state (D), and the brake operation is determined as a fuel-inefficient driving operation. Therefore, the bar 39 becomes longer than that of the state (D) to enter the brake second region Br2 that is the hatched region. By visually recognizing that the bar 39, extends into the hatched region, a driver can recognize that his/her brake operation deteriorates the fuel efficiency. Further, because the brake operation is determined as a fuel-inefficient driving operation, the background color 33 of the first display unit 13 is the second color (in this embodiment, blue). By visually recognizing that the background color 33 is the second color, a driver can recognize that his/her brake operation deteriorates the fuel efficiency.

Thus, the background color 33 of the first display unit 13 and the length of the bar 39 of the coaching display region 37 of the second display unit 15 can encourage a driver to perform the accelerator operation and brake operation such that the background color 33 is not changed into the second color, or such that the bar 39 does not extend into the second region.

Conventionally, only the current fuel efficiency is calculated and displayed. A driver can check the fuel efficiency to some extent by visually recognizing the fuel efficiency display. However, such display only feeds back to the driver the fuel efficiency that is a result of the driving operation. Even if only the fuel efficiency display is provided to the driver, it is difficult for the driver to determine how to perform the driving operation so as to improve the fuel efficiency. In contrast, in the embodiment of the invention, every time a driver performs the accelerator operation or brake operation, the driver can visually recognize whether the background color becomes the second color; or whether the bar extends into the second region, to confirm whether his/her driving operation is a fuel-efficient driving operation. The driver tries to perform the driving operation such that the background color is not changed into the second color, or such that the bar does not enter the second region, which allows the driver to naturally learn the lower-fuel-consumption driving skill for not only the accelerator operation but also the brake operation.

In this embodiment, both the first and second display units 13 and 15 are provided to change both the background color 33 and the length of the bar 39 according to the driving operation. Alternatively, only one of the background color 33 and the length of the bar 39 can cause a driver to learn the driving skill as described above. Accordingly, it is not always necessary to provide both the background color 33 and the length of the bar 39 on the first and second display units 13 and 15.

In this embodiment, the background color 33 and/or the length of the bar 39 are controlled for both the accelerator operation and the brake operation. Alternatively, the background color 33 aid/or the length of the bar 39 may be controlled for on of the accelerator operation and the brake operation.

In this embodiment, the background color 33 (see FIG. 2(a)) of the information 31 displayed on the first display unit 13 is changed. The object to be changed is not limited to the background color. Any color displayed on the first display unit 13 may be changed. For example, the color of the information 31 may be changed. In this embodiment, the information 31 indicates the operating state of the vehicle. However, the information 31 is not limited to the vehicle operating state. For example, information (such as ambient temperature) other than the vehicle operating state may be displayed. Further, some indicia (such as graphics, symbol, character, or mark) may be displayed on the first display unit 13, and a color of the indicia may be changed. Instead, a color of a predetermined display region on the first display unit 13 may be changed. For the color of the information 31, the color of an indicia, and the color of a predetermined display region (for example, a region having a predetermined range established at an end (for example, upper end) of a display screen of the first display unit 13), a control can be performed in a similar way to the background color 33, thereby coaching a driver for the driving skill for improving the fuel efficiency.

Further, the color used for the accelerator operation may differ from the color for the brake operation on the first display unit 13. For example, for the accelerator operation, the first color may be set to green while the second color is set to blue. On the other hand, for the brake operation, the first color may be set to yellow while the second color is set to red.

In doing so, a driver tries to perform the accelerator operation such that the color of the first display unit 13 does not become blue, and the driver tries to perform the brake operation such that the color of the first display unit 13 does not become red. Thus, the driver can learn the lower-fuel-consumption driving skill for both the accelerator and brake operations.

[Control Form]

A control technique for implementing the above display form according to an embodiment of the invention will be described.

Figure 4:
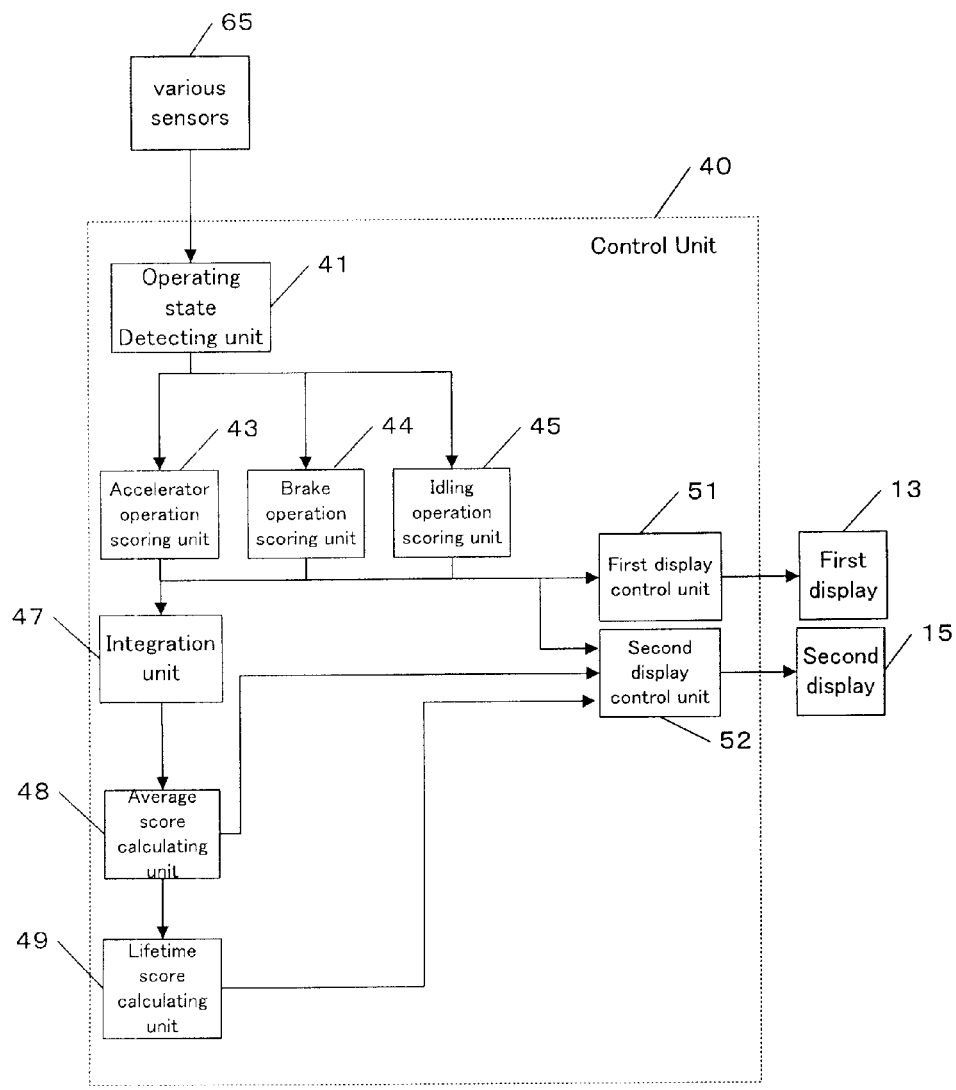
FIG. 4 is a block diagram illustrating an apparatus for coaching for a driving operation in an embodiment of the invention.

FIG. 4 is a block diagram of a controller, which is mounted on the vehicle, for controlling displays on the first and second display units 13 and 15 according to the driving operation by a driver in an embodiment of the invention. The controller includes a control unit 40. The control unit 40 can be implemented in an Electronic Control Unit (ECU). The ECU is a computer including a Central Processing Unit (CPU) and a memory. Each functional block of the control unit 40 can be implemented by the CPU executing one or more programs in the memory.

An operating state detecting unit 41 detects whether the accelerator operation (as described above, operation for driving the vehicle) is performed and whether the brake operation (as described above, operation for braking the vehicle) is performed. Various sensors 65 are mounted on the vehicle. The operating state detecting unit 41 detects the accelerator operation and the brake operation based on detection values of the sensors 65. The detection may be made by any appropriate technique. For example, a vehicle speed sensor is used. If the vehicle travels at a constant speed or is accelerated, it is determined that the accelerator operation is performed. If the vehicle is decelerated, it is determined that the brake operation is performed. Alternatively, sensors for detecting an operation for depressing the accelerator pedal and the brake pedal may be used. In such a case, the accelerator operation through the accelerator pedal and the brake operation through the brake pedal can be detected.

If it is detected that the accelerator operation is performed, the operating state detecting unit 41 detects a vehicle operating state according to the accelerator operation based on detection values of the sensors 65. In one embodiment, the operating state is an engine rotational speed and an opening degree of a throttle valve. The engine rotational speed can be detected based on a crank angle sensor (a sensor for detecting a rotation angle of a crankshaft) provided in the vehicle. The throttle valve is provided in an intake air passage to the engine. The opening degree of the throttle valve (hereinafter referred to as a throttle opening) can be detected by a throttle opening degree sensor.

If it is detected that the brake operation is performed, the operating state detecting unit 41 detects a vehicle operating state according to the brake operation based on detection values of the sensors 65. In one embodiment, the operating state is a vehicle speed and an acceleration (which is expressed by a negative value because the bake operation causes deceleration). The vehicle speed and the acceleration can be detected by a vehicle speed sensor provided in the vehicle. Alternatively, an acceleration sensor may be provided as one of the various sensors 65 to detect the acceleration of the vehicle.

Control According to Accelerator Operation

Based; on the operating state thus detected in response to the accelerator operation, an accelerator operation scoring unit 43 evaluates the accelerator operation from the viewpoint of fuel efficiency to determine the length of the bar 39 and the background color 33 while determining a score (point) for the accelerator operation. This technique will be described in detail.

Figure 5:
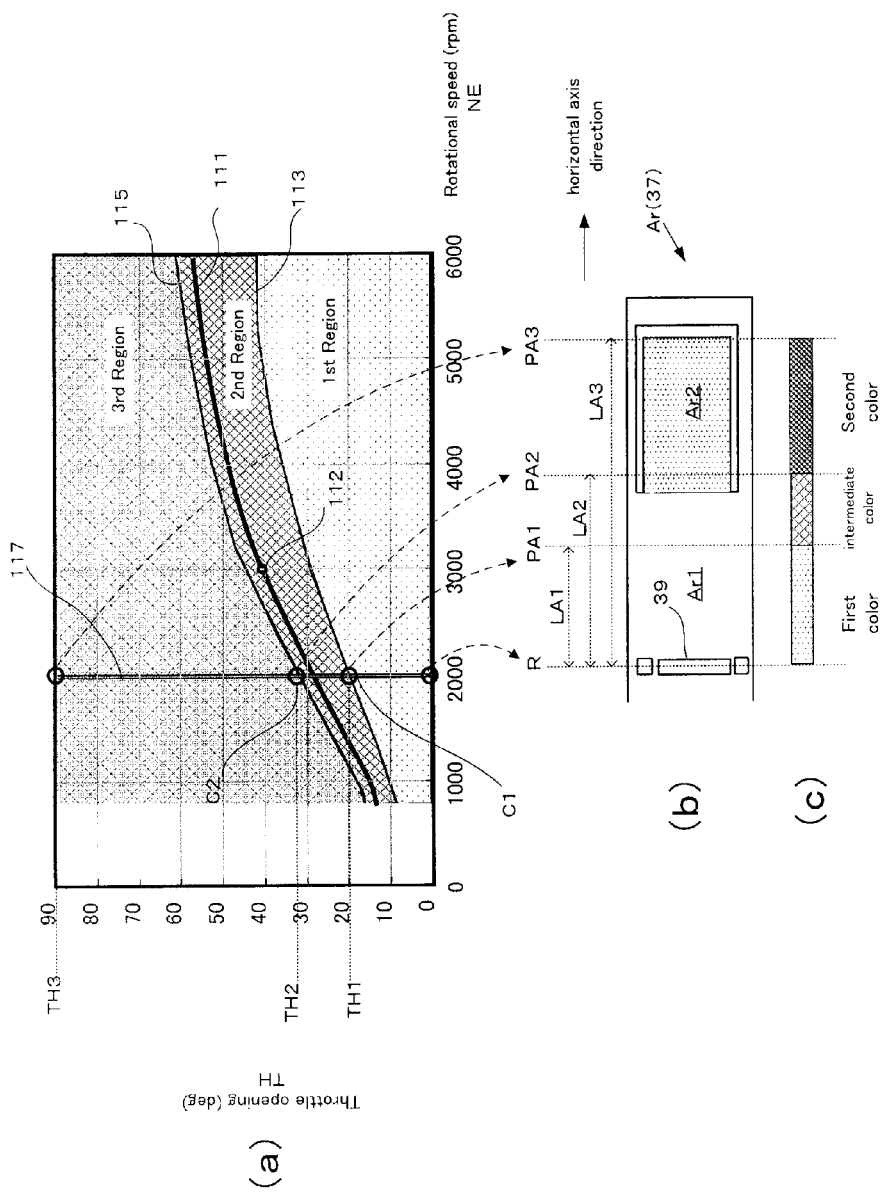
FIG. 5 is a view for explaining a technique for determining a bar length and a background color according to an accelerator operation in an embodiment of the invention.

FIG. 5(*a*) shows an example of a map, that is pre-stored in the memory of the control unit 40. A horizontal axis of the map indicates an engine rotational speed (rpm). A vertical axis indicates a throttle opening (deg). A line 111 shown by a bold sold line indicates an operating state for implementing a predetermined optimum value of BSFC (Brake Specific Fuel Consumption, unit is [g/kWh]), that is, a value established as the best fuel efficiency. This line is predetermined for each engine rotational speed and throttle opening based on the engine characteristics of the vehicle. For example, it is seen that, when the engine rotational speed is 3000 rpm, the optimum brake specific fuel consumption can be implemented at the throttle opening of about 40 degrees, as indicated by a point 112.

A region where the engine rotational speed is lower than about 800 rpm is not shown in the figure. This is because the engine is in the idling operation state. A control when the engine is in the idling operation state is described later.

In the figure, the fuel efficiency is deteriorated as the throttle opening is increased under the same engine rotational speed. Thus, this embodiment, the operating region is divided into three regions in the vertical axis direction to establish three fuel efficiency states consisting of a fuel-efficient state, a fuel-inefficient state, and a state between the fuel-efficient state and the fuel-inefficient state. Specifically, the operating region is divided into one region located near the BSFC line 111 and two regions located below and above the region. These three regions are partitioned by lines 113 and 115. The region located below the line 113 is referred to as a first region. The region located between the lines 113 and 115 is referred to as a second region. The region located above the line 115 is referred to as a third region. The first region is established as a region where the fuel efficiency is good. The third region is established as a region where the fuel efficiency is not good. The second region is established as a region where the fuel efficiency is relatively good and does not reach an inefficient state.

The third region corresponds to an operating region where an accelerator operation that leads to a sudden acceleration or an excessively high vehicle speed is performed. The second region corresponds to an operating region where an accelerator operation that leads to a moderate acceleration is performed. The first region corresponds to an operating region where an accelerator operation for cruise travel is performed. Accordingly, the first and second regions correspond to a safer operating region.

Thus, the map where the three regions are previously set is pre-stored in the memory. Based on the engine rotational speed (expressed by NE) and the throttle opening (expressed by TH) that are detected in response to the accelerator operation, the accelerator operation scoring unit 43 refers to the map thus, stored to determine the length of the bar 39 and the background color 33. In order to describe this technique, it is assumed that the detected engine rotational speed NE is 2000 rpm. A line 117 indicating the engine rotational speed of 2000 rpm is shown in the vertical axis direction. It is assumed, that TH1 is a throttle opening corresponding to an intersection C1 of the lines 117 and 113. TH2 is a throttle opening corresponding to an intersection C2 of the lines 117 and 115. TH3 is a maximum value (in the example of the figure, 90 degrees) of the throttle opening.

On the other hand, FIG. 5(*b*) shows the accelerator region Ar of the coaching region 37 that is described with reference to FIG. 2(*b*). Each position in the horizontal axis direction of the accelerator region Ar is expressed with respect to the reference position R. As described above, the accelerator first region Ar1 that is the non-hatched region represents a fuel-efficient accelerator operation state, and the accelerator second region Ar2 that is the hatched region represents a fuel-inefficient accelerator operation state. A predetermined first position PA1 is set in the accelerator first region Ar. A predetermined second position PA2 is set, in the second region Ar2, near a boundary between the accelerator first and second regions Ar1 and Ar2. A third position PA3 is set at the right end of the accelerator second region Ar2. These positions are previously established as fixed positions. LA1, LA2, and LA3 indicate distances from the reference position R to the first through third positions PA1 to PA3, respectively.

Allocation between the first through third regions in the map of FIG. 5(*a*) and the accelerator region Ar will be described. A range from the reference position R to the first position PA1 is brought into correspondence with the first region of the map. A range of the first position PA1 to the second position PA2 is brought into correspondence with the second region of the map. A range of the second position PA2 to the third position PA3 is brought into correspondence with the third region of the map. Accordingly, when the engine rotational speed NE is 2000 rpm, a throttle opening range from zero to TH1 is allocated to the range from the position R to the position PA1. A throttle opening range from TH1 to TH2 is allocated to the range from the position PA1 to the position PA2. A throttle opening range from TH2 to TH3 is allocated to the range from the position PA2 to the position PA3.

The accelerator operation scoring unit 43 determines which region in the map the vehicle operating state expressed by the detected engine rotational speed NE and throttle opening TH exists in. If the vehicle operating state exists in the first region, the length of the bar 39 is calculated by LA1×TH/(TH1−0). If the vehicle operating state exists in the second region, the length of the bar 39 is calculated by LA1+(LA2−LA1)×(TH−TH1)/(TH2−TH1). If the vehicle operating state exists in the third region, the length of the bar 39 is calculated by LA2+(LA3−LA2)×(TH−TH2)/(TH3−TH2).

The second display control unit 52 of FIG. 4 displays the bar 39 having the length thus calculated on the accelerator region Ar of the coaching region 37. Thus, by determining where the vehicle operating state corresponding to the accelerator operation is located in the map, it is evaluated whether the accelerator operation is a fuel-efficient driving operation state. The bar 39 is changed so as to have the length expressing the evaluation result.

If the vehicle operating state corresponding to the accelerator operation is within the first region, a diver visually recognizes that the bar 39 remains in the non-hatched region. Therefore, the driver can recognize that his/her accelerator operation is a fuel-efficient driving operation. On the other hand, if the vehicle operating state corresponding to the accelerator operation is within the third region, a driver visually recognizes that the bar 39 extends into the hatched region. Therefore, the driver can recognize that his/her accelerator operation is a driving operation that deteriorates the fuel efficiency. If the vehicle operating state corresponding to the accelerator operation is within the second region, a driver visually recognizes that the bar 39 extends to near the boundary between the non-hatched region and the hatched region. Therefore, the driver can recognize that he/she should more carefully perform the accelerator operation such that the accelerator operation does not lead to the operating state that deteriorates the fuel efficiency.

Further, the accelerator operation scoring-unit 43 determines which of the first to third regions of the map of FIG. 5(a) the vehicle operating state expressed by the detected engine rotational speed NE and throttle opening TH exists in. If the vehicle operating state is within the first region, the first color is selected as the background color 33 of the first display unit 13. If the vehicle operating state is within the third region, the second color is selected as the background color 33. If the vehicle operating state is within the second region, an intermediate color between the first color and the second color is selected as the background color 33. This is shown in FIG. 5(c). In the case where the detected engine rotational speed NE is 2000 rpm, the first color is selected if the detected throttle opening TH is between zero and TH1, the intermediate color is selected if TH is between TH1 and TH2, and the second color is selected if TH is between TH2 and TH3.

The first display control unit 51 of FIG. 4 controls the light source of the first display unit 13 such that the selected color is displayed as the background color 33. Thus, the accelerator operation is evaluated from the viewpoint of fuel efficiency based on the vehicle operating state corresponding to the accelerator operation, and the background color 33 is changed into a color representing the evaluation result.

If the vehicle operating state corresponding to the accelerator operation is within the first region, a driver visually recognizes that the background color 33 is the first color. Therefore, the driver can recognize that his/her accelerator operation is a fuel-efficient driving operation. On the other hand, if the vehicle operating state corresponding to the accelerator operation is within the third region, the background color 33 becomes the second color. By visually recognizing that the background color 33 becomes the second color, a driver can recognize that his/her accelerator operation is a driving operation that deteriorates the fuel efficiency. If the vehicle operating state corresponding to the accelerator operation is within the second region, the background color 33 becomes an intermediate color between the first and second colors. By visually recognizing the intermediate color, a driver can recognize that he/she should more carefully perform the accelerator operation such that the background color 33 does not become the second color.

Figure 6:
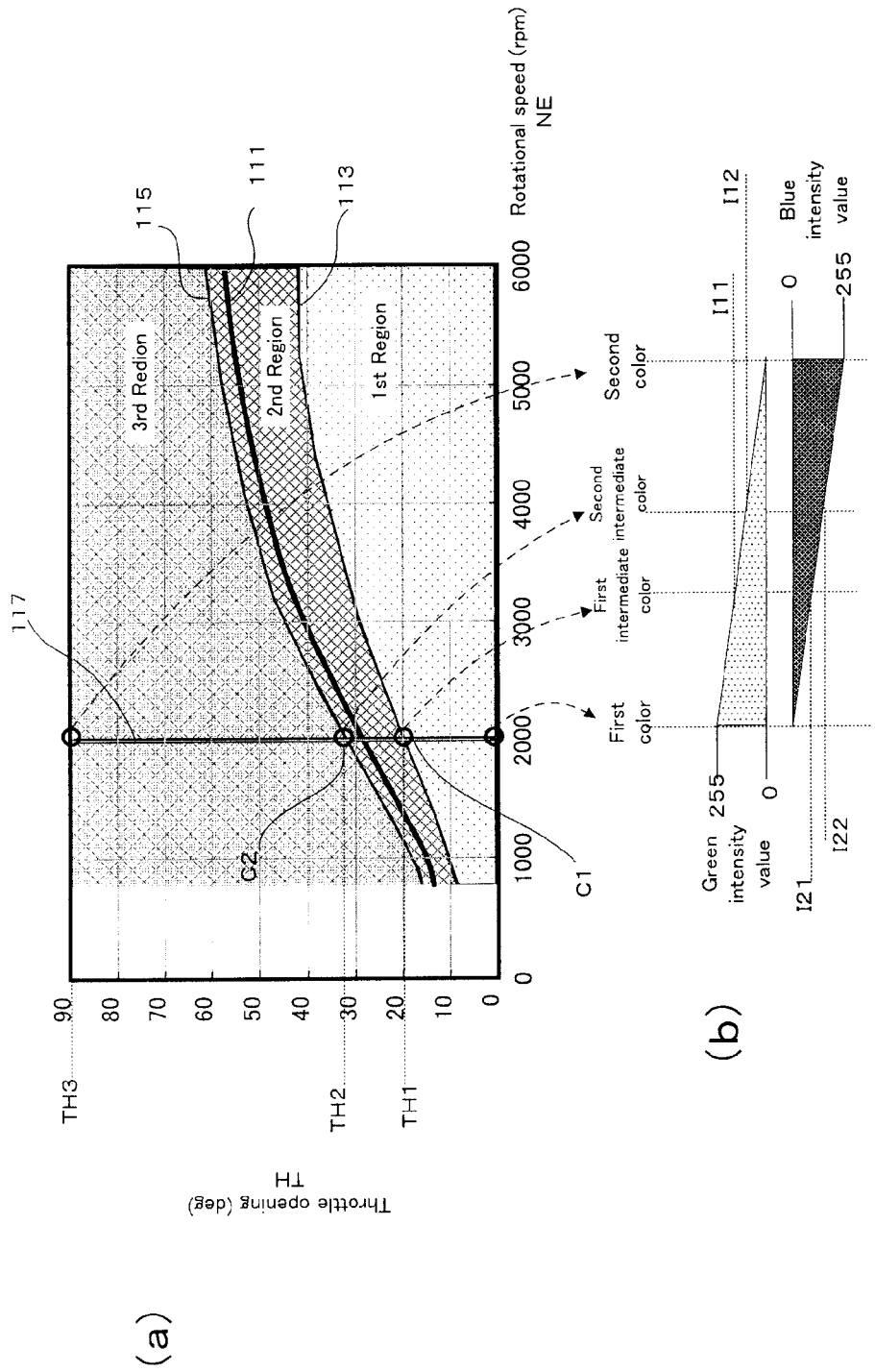
FIG. 6 is a view for explaining another technique for determining a background color according to an accelerator operation in an embodiment of the invention.

As described above, one intermediate color is provided between the first and second colors in this embodiment. Alternatively, a plurality of intermediate colors having different intensity values may be provided. For example, FIG. 6 shows similar figures to FIG. 5. FIG. 6(a) is identical to FIG. 5(a). Referring to FIG. 6(b), an upper triangle indicates that an intensity value of green in three primary colors (RGB) ranges from zero to 255, and a lower triangle indicates that an intensity value of blue in the three primary colors ranges from zero to 255. For the first color, the green intensity value is 255 while the blue intensity value is zero (that is, green). For the second color, the blue intensity value is 255 while the green intensity value is zero (that is, blue). In this case, 256 colors can be generated between the first and second colors.

A range from the first color to a predetermined first intermediate color is brought into correspondence with, the first region, of the map. A range from the first intermediate color to a predetermined second intermediate color is brought into correspondence with the second region of the map. A range from the second intermediate color to the second color is brought into correspondence with the third region of the map. Thus, the background color to be displayed can be determined in a similar way to the technique for calculating the length of the bar. Here, the first intermediate color and the second intermediate color are predetermined. The green intensity value and the blue intensity value of the first intermediate color are expressed by I11 and I21, respectively. The green intensity value and the blue intensity value of the second intermediate color are expressed by I12 and I22, respectively.

For example, it is assumed that the detected engine rotational speed NE is 2000 rpm. If the detected throttle opening TH is within the first region, the green intensity value is calculated by $255-((255-I11) \times TH/TH1)$ and the blue intensity value is calculated by $I21 \times TH/TH1$. If the throttle opening TH is within the second region, the green intensity value is calculated by $I11-((I11-I12) \times (TH-TH1)/(TH2-TH1))$ and the blue intensity value is calculated by $I21+((I22-I21) \times (TH-TH1)/(TH2-TH1))$. If the throttle opening TH is within the third region, the green intensity value is calculated by $I12-(I12 \times (TH-TH2)/(TH3-TH2))$ and the blue intensity value is calculated by $I22+((255-I22) \times (TH-TH2)/(TH3-TH2))$.

According to the intensity values determined for blue and green, the first display control unit 51 controls, the blue light source and green light source to display the background color 33.

The intensity value of the above embodiment is one example. Another number of levels of the gradation may be used instead of 256 levels. Green and blue are one example. Any other colors may be used. In this embodiment, the intermediate color is generated by controlling the green light source and the blue light source. However, any technique for mixing colors may be used. For example, the intermediate color may be generated using a filter. As described above, in a case where the color of the information 31 is changed instead of the background color 33, the first display control unit 51 may control elements constituting the color, such as values of pixels constituting the information, so as to display the information with the color intensity value determined in the above-described technique. The colors of an indicia and predetermined display region may be also changed in a similar way.

In the map of FIG. 5(a), the engine rotational speed and the throttle opening are used as the vehicle operating state for evaluating the accelerator operation from the viewpoint of fuel efficiency. However, the vehicle operating state is not limited to the engine rotational speed and the throttle opening. Because the map is used to check whether a fuel-efficient operating state is implemented by the accelerator operation, any appropriate operating state parameter that is usable as an index of the fuel efficiency may be used. For example, the map may be created, using a gravity acceleration (acceleration G), a stroke amount of the accelerator pedal, fuel consumption, and a magnitude of a negative pressure of the engine.

In the map of FIG. 5(a), the second region is provided between the first region representing a fuel-efficient state and the third region representing a fuel-inefficient state, which allows the level of the driver's driving skill to be raised (which is described later). Alternatively, only a region representing a fuel-efficient state and a region representing a fuel-inefficient state may be set in the map without establishing the second region.

Figure 7:
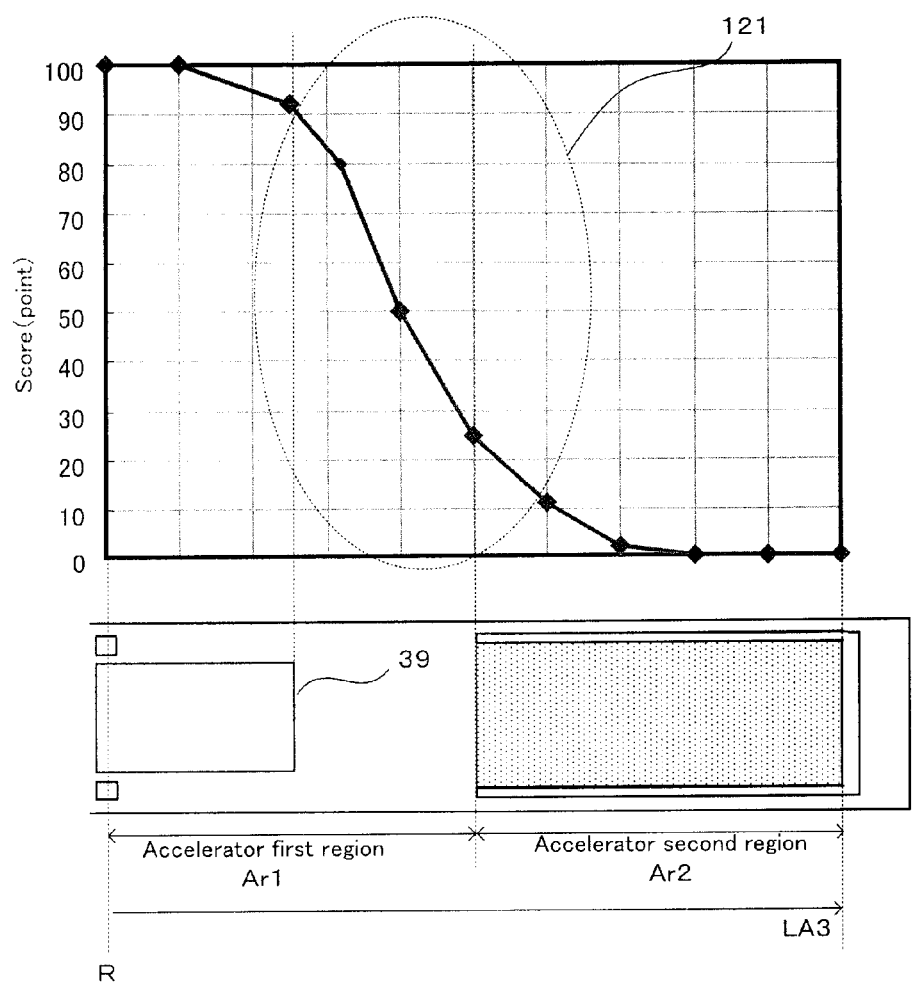
FIG. 7 is a view for explaining a technique for determining a score according to an accelerator operation in an embodiment of the invention.

Further, the accelerator operation scoring unit 43 refers to a map as shown in FIG. 7 based on the calculated length of the bar 39 to determine a score (point) for the current accelerator operation. The map may be pre-stored in the memory of the control unit 40. In this example, the score ranges from zero to 100 (points). 100 corresponds to the reference position R, and zero corresponds to a position at a distance of the length of LA3 from the reference position R (that is, the right end of the accelerator region Ar or the third position PA3 of FIG. 5(b)). In the example of the figure, the score corresponding to the length of the bar 39 is 90 points. As shown in the figure, a higher score is obtained as the length of the bar 39 is shorter, that is, as a more fuel-efficient accelerator operation is performed.

In this embodiment, the score is expressed by an integer. Accordingly, when the score corresponding to the length of the bar 39 is a decimal, the score is round off to the nearest integer.

In this embodiment, as shown by a region 121, the score value is largely changed in a score range corresponding to a portion of the accelerator first region Ar1 near the accelerator second region Ar2. The reason is to encourage a driver to perform the accelerator operation within the first and second regions without entering the third region of the map, as described with reference to the map of FIG. 5(*a*). Alternatively, the score may be allocated so as to linearly change with the length of the bar 39.

Figure 2:
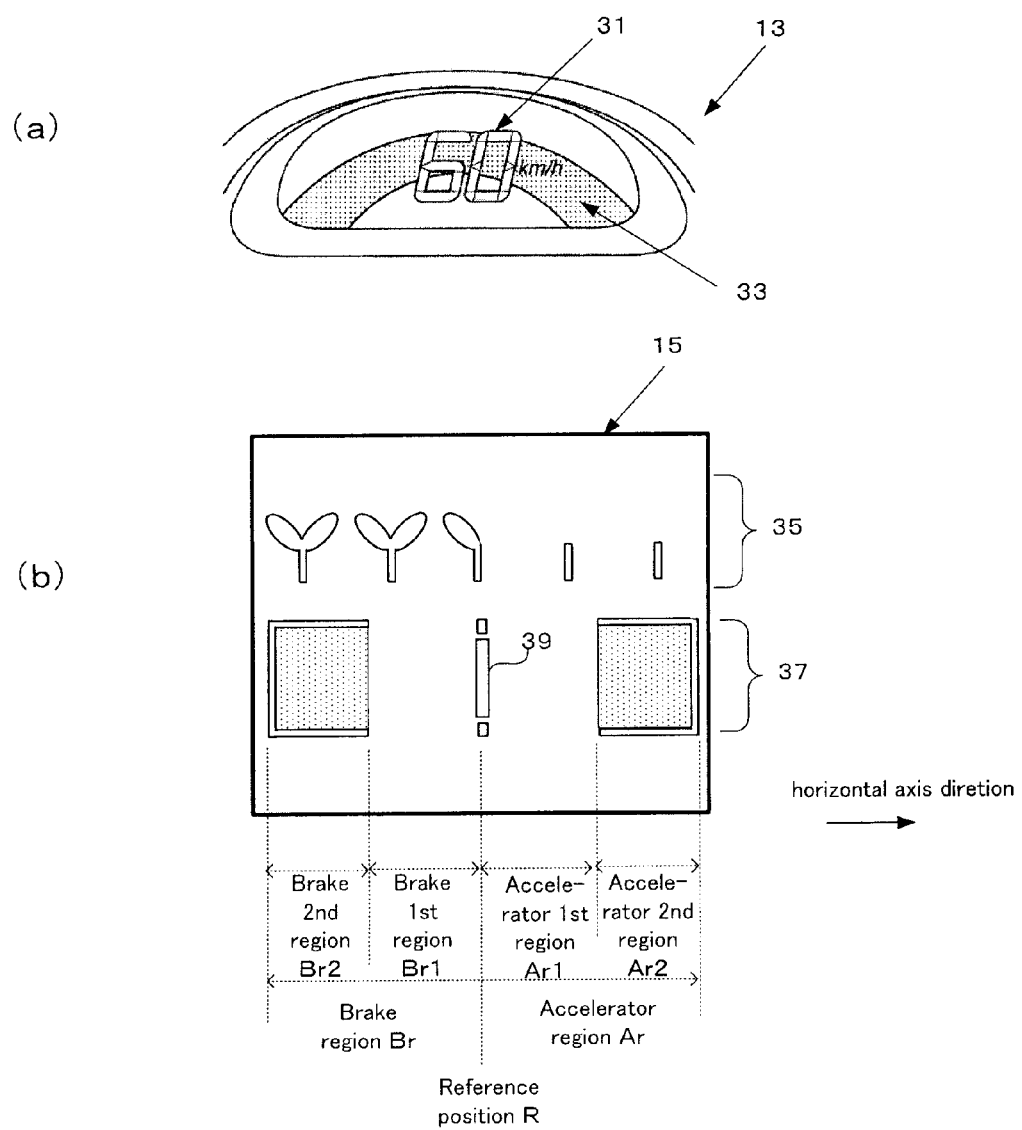
FIG. 2 illustrates displays on a first display unit and a second display unit in an embodiment of the invention.
Figure 3:
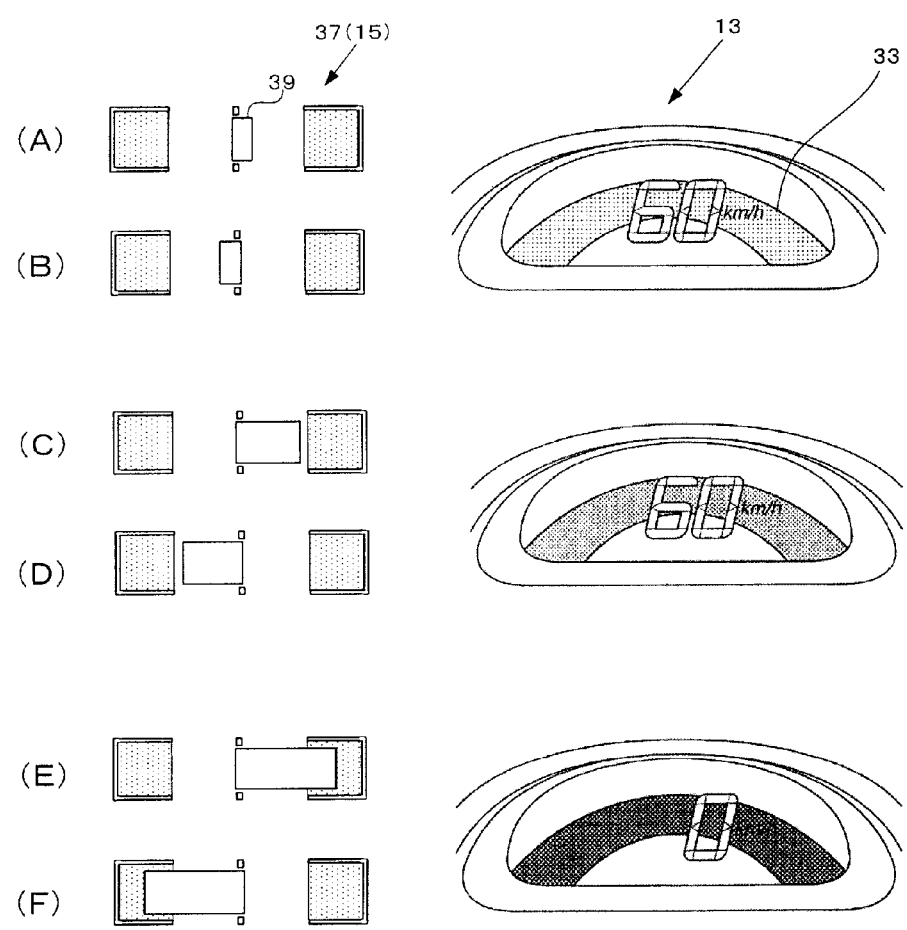
FIG. 3 illustrates changes in displays on the first display unit and the second display unit according to an accelerator operation and a brake operation in an embodiment of the invention.

In an embodiment where the display of FIG. 2(*a*) is performed while the coaching region 37 of FIG. 2(*b*) is not displayed, the length of the bar 39 calculated from the map of FIG. 5(*a*) may be used as a value for determining the score. In a case where the gradation control is performed as described referring to the map of FIG. 6, the horizontal axis of FIG. 7 is set as corresponding to a range of the intermediate colors between the first and second colors as shown in FIG. 6, which allows the score corresponding to each intermediate color to be determined.

Thus, the accelerator operation scoring unit 43 determines a score as a result of evaluating the accelerator operation from the viewpoint of fuel efficiency every time the accelerator operation is performed. Hereinafter, the score is referred to as an accelerator score.

Control According to Brake Operation

A brake operation scoring unit 44 of FIG. 4 will be described. Based on the vehicle operating state detected in response to the brake operation, the brake operation scoring unit 44 evaluates the brake operation from the viewpoint of fuel efficiency to determine the length of the bar 39 and the background color 33 while determining a score (point) for the brake operation. This technique will be described in detail.

Figure 8:
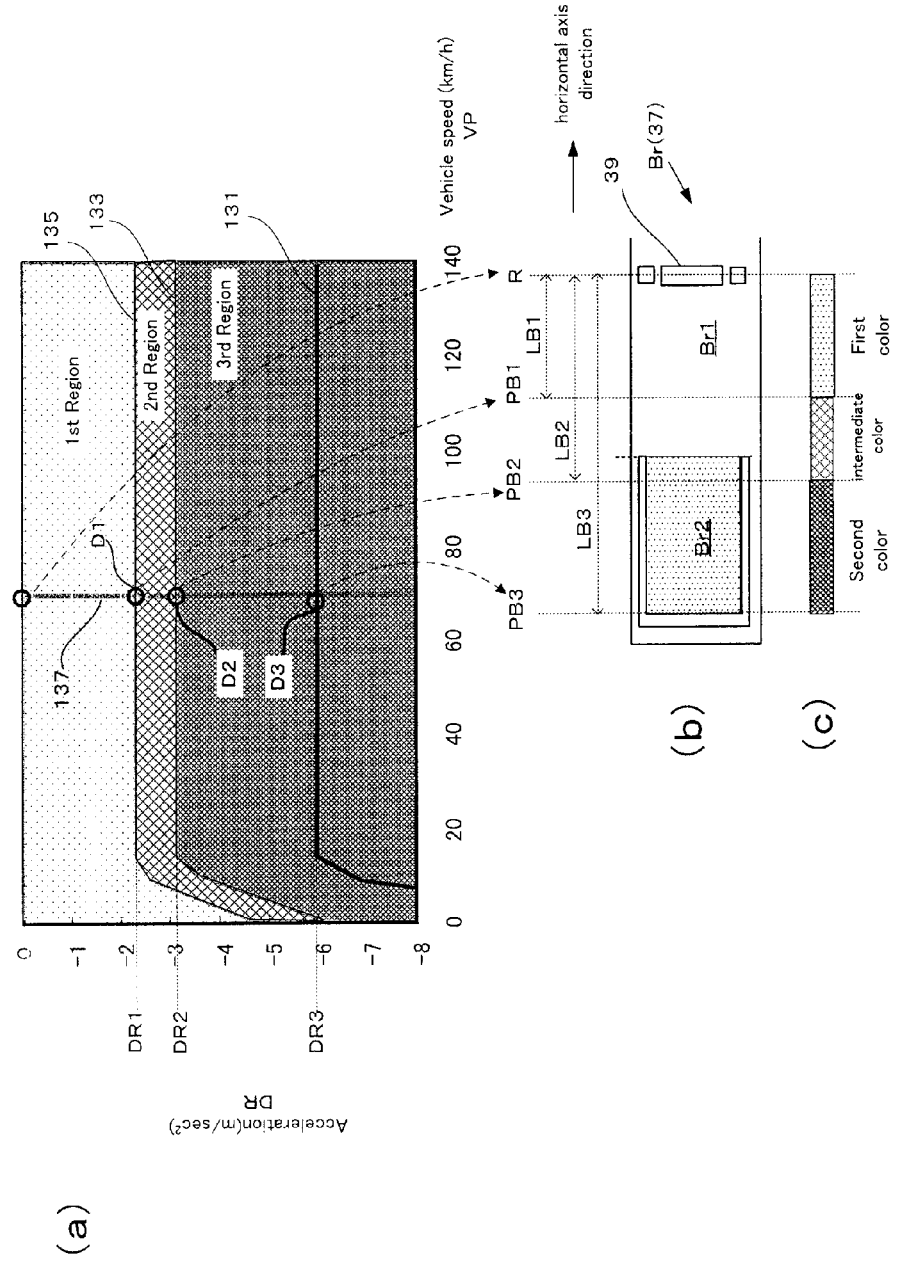
FIG. 8 is a view for explaining a technique for determining a bar length and a background color according to a brake operation in an embodiment of the invention.

FIG. 8(*a*) shows an example of a map that is pre-stored in the memory of the control unit 40. A horizontal axis of the map indicates a vehicle speed (km/h). A vertical axis indicates an acceleration (m/sec$^2$), which has a negative value because the brake operation causes deceleration of the vehicle. A line 131 shown by a bold sold line indicates a value representing an acceleration when a predetermined sudden brake operation is performed during normal traveling (the normal travel in this example indicates a travel at a speed greater than about 15 km/h). The value of line 131 is predetermined by a simulation or the like. In this embodiment, the value of line 131 is set to −6 m/sec$^2$ by way of example, but is not limited to this value.

In the figure, the fuel efficiency is deteriorated as an absolute value of the acceleration is increased under the same vehicle speed. In this embodiment, as with the accelerator operation, the operating region is divided into three regions in the vertical axis direction to establish three fuel efficiency states consisting of a fuel-efficient state, a fuel-inefficient state, and a state between the fuel-efficient state and the fuel-inefficient state. Specifically, the third region including the line 131 is established as a region where the fuel efficiency is not good. The third region is located below a line 133, and corresponds to the operating region where a brake operation leading to a sudden deceleration is performed. The first region is established as a region where the fuel efficiency is good. The first region is located above a line 135, and corresponds to the operating region where a brake operation that is strong sufficient to stop the vehicle when there is a sufficient inter-vehicle distance is performed. The second region is established as a region where the fuel efficiency is relatively good and does not reach an insufficient state. The second region is located between the lines 133 and 135. More preferably, the first and second regions are established to be an operating region where a skid can be more securely avoided by the brake operation on a low-μ road (road having a low static friction coefficient μ). Thus, the first and second regions are the operating region where a sudden deceleration is not performed, and hence the first and second regions can be considered as a safer operating region. The lines 133 and 135 partitioning the first to third regions are predetermined through a simulation or the like.

In a case of a hybrid vehicle where the vehicle travels by a combination of an engine and an electric motor; a regenerative bake is used. In such a case, the map is preferably created such that the brake operation where the amount of regeneration by the regenerative brake does not reach a predetermined upper limit is within the first and second regions. This encourages a driver to drive the vehicle with higher energy efficiency.

Thus, the map where the three regions are previously set is pre-stored in the memory. Based on the vehicle speed (expressed by VP) and acceleration (expressed by DR) that are detected in response to the brake operation, the brake operation scoring unit 44 refers to the map thus stored to determine the length of the bar 39 and the background color 33. In order to describe this technique, it is; assumed that the detected vehicle speed VP is 70 km/h. A line 137 indicating the vehicle speed of 70 km/h is shown in the vertical axis direction. It is assumed that DR3 is an acceleration corresponding to an intersection D3 of the lines 137 and 131, DR2 is an acceleration corresponding to an intersection D2 of the lines 137 and 133, and DR1 is an acceleration corresponding to an intersection D1 of the lines 137 and 135.

On the other hand, FIG. 8(*b*) shows the brake region Br of the coaching region 37 that is described with reference to FIG. 2(*b*). Each position in the horizontal direction of the brake region Br is expressed with respect to the reference position R. As described above, the brake first region Br1 that is the non-hatched region represents a fuel-efficient brake operation state. The brake second region Br2 that is the hatched region represents a fuel-inefficient brake operation state. A predetermined first position PB1 is set in the brake first region Br1. A predetermined second position PB2 is set, in the brake second region Br2, near a boundary between the brake first region Br1 and the brake second region Br2. A third position PB3 is set at the left end of the brake second region Br2. These positions are previously established as fixed positions. LB1, LB2, and LB3 indicate distances from the reference position R to the first through third positions PB1 to PB3, respectively.

Allocation between the first through third regions located above the line 131 in the map of FIG. 8(*a*) and the brake region Br will be described. A range from the reference position R to the first position PB1 is brought into correspondence with the first region of the map. A range from the first position PB1 to the second position PB2 is brought into correspondence with the second region of the map. A range from the second position PB2 to the third position PB3 is brought into correspondence with the third region of the map. Accordingly, when the detected vehicle speed VP is 70 km/h, an acceleration range from zero to DR1 is allocated to the range from the position R to the position PB1. An acceleration range from DR1 to DR2 is allocated to the range from the position PB1 to the position PB2. An acceleration range from DR2 to DR3 is allocated to the range from the position PB2 to the position PB3.

The brake operation scoring unit 44 determines which region of the map the vehicle operating state expressed by the detected vehicle speed VP and acceleration DR exists in. If the vehicle operating state exists in the first region, the length of the bar 39 is calculated by LB1×|DR|/|DR1|. Here, || indicates an absolute value. If the acceleration DR exists in the second region, the length of the bar 39 is calculated by LB1+(LB2−LB1)×(|DR|−|DR1|)/(|DR2|−|DR1|). If the acceleration DR exists in the third region, the length of the bar 39 is calculated by LB2+(LB3−LB2)×(|DR|−|DR2|)/(|DR3|−|DR2|).

In this embodiment, as described in the above allocation, because the intersection D3 of the lines 131 and 137 is set to the left-end (position PB3) of the brake region Br, the bar 39 is stuck at the left end of the brake region Br when the brake operation that leads to a deceleration whose magnitude is larger than the acceleration DR3 corresponding to D3 is performed. Thus, a driver can be encouraged to suppress the brake operation that leads to a deceleration whose magnitude is larger than the acceleration DR3.

The second display control unit 52 of FIG. 4 displays the bar 39 having the length thus calculated on the brake region Br of the coaching region 37. Thus, by determining where the vehicle operating state corresponding to the brake operation is located in the map, it is evaluated whether the brake operation is a fuel-efficient driving operation state. The bar 39 is changed so as to have the length expressing the evaluation result.

If the vehicle operating state corresponding to the brake operation is within the first region, a driver visually recognizes that the bar 39 remains in the non-hatched region. Therefore, the driver can recognize that his/her brake operation is a fuel-efficient driving operation. On the other hand, if the vehicle operating state corresponding to the brake operation is within the third region, a driver visually recognizes that the bar 39 extends into the hatched region. Therefore, the driver can recognize that his/her brake operation is a driving operation that deteriorates the fuel efficiency. If the vehicle operating state corresponding to the brake operation is within the second region, a driver visually recognizes that the bar 39 extends to near the boundary of the non-hatched region and the hatched region. Therefore, the driver can recognize that he/she should more carefully perform the brake operation such that the brake operation does not lead to an operating state that deteriorates the fuel efficiency.

Further, the brake operation scornig unit 44 determines which of the first to third regions of the map of FIG. 8(a) the vehicle operating state expressed by the detected vehicle speed VP and acceleration DR exists in. If the vehicle operating state is within the first region, the first color is selected as the background color 33 of the first display unit 13. If the vehicle operating state is within the third region, the second color is selected as the background color 33. If the vehicle operating state is within the second region, an intermediate color between the first and second colors is selected as the background color 33. This is shown in FIG. 8(c). In the case where the detected vehicle speed VP is 70 km/h, the first color is selected if the magnitude of the detected acceleration DR is between zero and DR1, the intermediate color is selected if the magnitude of DR is between DR1 and DR2, and the second color is selected if the magnitude of DR is greater than DR2.

The first display control unit 51 of FIG. 4 controls the light source of the first display unit 13 such that the selected color is displayed as the background color 33. Thus, the brake operation is evaluated from the viewpoint of fuel efficiency based on the vehicle operating state corresponding to the brake operation, and the background color 33 is changed into a color indicating the evaluation result.

If the vehicle operating state corresponding to the brake operation is within the first region, a driver visually recognizes that the background color 33 is the first color. Therefore, the driver can recognize that his/her brake operation is a fuel-efficient driving operation. On the other hand, if the vehicle operating state corresponding to the brake operation is within the third region, the background color 33 becomes the second color. By visually recognizing that the background color 33 becomes the second color, a driver can recognize that his/her brake operation is a driving operation that deteriorates the fuel efficiency. If the vehicle operating state corresponding to the brake operation is within the second region, the background color 33 becomes an intermediate color between the first and second colors. By visually recognizing the intermediate color, a driver can recognize that he/she, should more carefully perform the brake operation such that the background color 33 does not become the second color.

As described above with reference to FIG. 6 for the accelerator operation, the acceleration range from zero to DR3 may be allocated to an intermediate color range between the first and second colors. The green intensity value and the blue intensity value are calculated in a similar way to FIG. 6, whereby a color to be displayed as the background color 33 may be determined.

In the map of FIG. 8(a), the vehicle speed and the acceleration are used as the vehicle operating state for evaluating the brake operation from the viewpoint of the fuel efficiency. However, the vehicle operating state is not limited to the vehicle speed and the acceleration. Because the map is used to check whether a fuel-efficient operating state is implemented by the brake operation, any appropriate operating state parameter that is usable as an index of the fuel efficiency may be used. For example, the map of FIG. 8(a) may be created using a gravity acceleration (acceleration G), a hydraulic pressure value of the brake, and a stroke amount of a brake pedal. In the case of a hybrid vehicle, the regenerative amount may be used because the electric energy is regenerated by the brake operation.

In the map of FIG. 8(a), as with the map for the accelerator operation, the second region is provided between the first region representing a fuel-efficient-state and the third region representing a fuel-inefficient state. Alternatively, only a region representing a fuel-efficient state and a region representing a fuel-inefficient state may be set in the map without establishing the second region.

Figure 9:
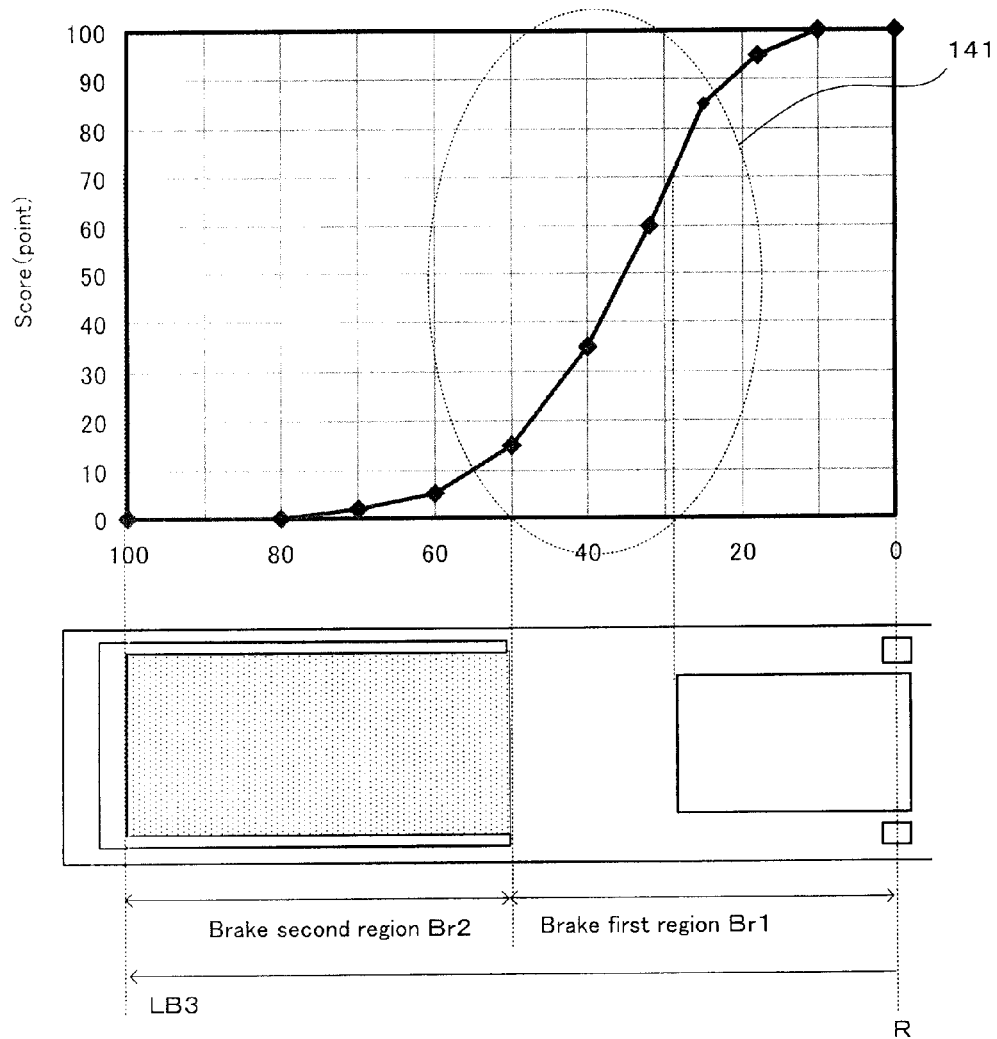
FIG. 9 is a view for explaining a technique for determining a score according to a brake operation in an embodiment of the invention.

Further, the brake operation scoring unit 44 refers to a map as shown in FIG. 9 to determine a score (point) for the current brake operation based on the calculated length of the bar 39. The map may be pre-stored in the memory of the control unit 40. In this; example, the score ranges from zero to 100 (points). 100 corresponds to the reference position R. Zero-corresponds to a position at a distance of a length of LB3 from the reference position R (that is, the left end of the brake region Br or the third position PB3 of FIG. 8(b)). In the example of the figure, the score corresponding to the length of the bar 39 is 70 points. As shown in the figure, a higher score is obtained as the length of the bar 39 is shorter, that is, as a more fuel-efficient brake operation performed.

In this embodiment, the score is expressed by an integer. Accordingly; when the score corresponding to the length of the bar 39 is a decimal, the score is round off to the nearest integer.

In this embodiment, as shown by a region 141, the score value is largely changed in a score range corresponding to a portion of the brake first region Br1 near the brake second region Br2. The reason is to encourage a driver to perform the brake operation within the first and second regions without entering the third region, as described with reference to the map of FIG. 8(*a*). Alternatively, the score may be allocated so as to linearly change with the length of the bar 39.

In an embodiment where the display of FIG. 2(*a*) is performed while the coaching region 37 of FIG. 2(*b*) is not displayed, the length of the bar 39 calculated from the map of FIG. 8(*a*) may be used as a value for determining the score. In a case where the gradation control is performed as described referring to the map of FIG. 6, the horizontal axis of FIG. 9 is set as corresponding to a range of the intermediate colors between the first and second colors as shown in FIG. 6, which allows the score corresponding to each intermediate color to be determined.

Thus, the brake operation scoring unit 44 determines a score as a result of evaluating the brake operation from the viewpoint of fuel efficiency every time the brake operation is performed. Hereinafter, the score is referred to as a brake score.

In this embodiment, the maps of FIGS. 5(*a*) and 8(*a*) are allocated to the accelerator region Ar and brake region Br of the coaching region 37 such that the bar 39 is shorter as the fuel efficiency becomes better. Alternatively, the maps may be allocated to the accelerator region Ar and brake region Br such that the bar 39 is longer as the fuel efficiency becomes better. In such a case, the length of the bar 39 is similarly controlled such that the tip of the extended bar 39 (the above-described displayed graphics may be used) moves away from the boundary of the accelerator first region (representing a fuel-efficient driving operation state) and the accelerator second region (representing a fuel-inefficient driving operation state) toward the accelerator first region side, as the accelerator operation is determined as being more fuel-efficient. The same may apply for the brake operation.

Control According to Idling Operation

Referring, back to FIG. 4, the operating state detecting unit 41 preferably detects an idling operation state of the vehicle. When the idling operation is initially started in one driving cycle, an idling operation scoring unit 45 sets an initial value in an idling score. Every time the idling operation is detected, the idling operation scoring unit 45 starts a timer (not shown) to measure an elapsed time of the idling operation. After a predetermined time has elapsed since the start of the idling operation, the idling operation scoring unit 45 subtracts from the idling score by a predetermined value at predetermined time intervals.

Figure 10:
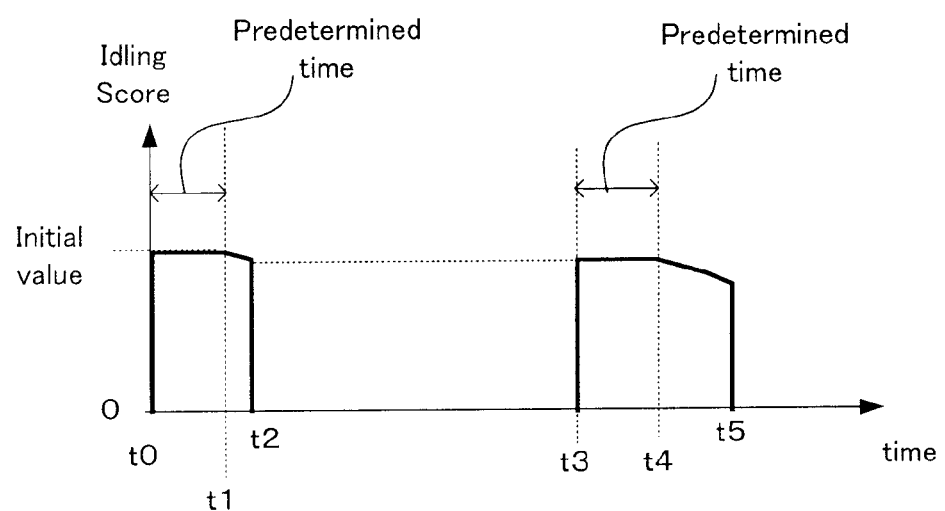
FIG. 10 is a view for explaining a technique for determining a score according to an idling operation in an embodiment of the invention.

Here, a technique for subtracting from the idling score will be described with reference to FIG. 10. At time t0, a driving cycle is started, and the idling operation is started. The initial value (in the embodiment, 100 points) is set in the idling score. From time t1 at which a predetermined time (for example, one minute) has elapsed since the idling operation was started to time t2 at which the idling operation is stopped, the idling score is decremented by a predetermined value at predetermined time intervals. Here, the predetermined time is preferably set in such a manner as to correspond to an idling duration necessary for the vehicle to temporarily stop or wait at a traffic light, and may be set based on a simulation or an empirical value. Thus, it is prevented that the idling score is decremented for the idling operation having a usual duration for a temporal stop and a wait at a traffic light. Because the idling operation having a duration longer than the predetermined time can be considered as, for example, parking for doing something (for example, stopping at a shop), the idling score becomes smaller as the duration of the idling operation is longer.

The idling score at time t2 at which the idling operation is stopped is stored and kept, for example, in the memory of the control unit 40. When the idling operation is re-started at time t3, the idling score stored in the memory (that is, the idling score at time t2) is read at time t4 after the predetermined time has elapsed since the idling operation was re-started, and the idling score is decremented by the predetermined value at predetermined time intervals until the idling is/stopped at time t5. Thus, the idling score is decreased with the duration of the idling operation in one driving cycle.

There is a vehicle (such as a hybrid vehicle) that is capable of performing the "idle-stop" as one mode of the idling operation. As is well known, the idle-stop is an operating state where the engine is stopped when the vehicle is temporarily stopped. Auxiliary equipment on the vehicle is driven by the motor. Preferably, an elapsed time during which the vehicle is in the idle-stop state is not included in the above predetermined time because fuel is not consumed in the idle-stop state. The idle-stop state can be detected by the operating state detecting unit 41 (FIG. 4).

In this embodiment, when the idling operation other than the idle-stop state is being performed (that is, fuel is consumed), the second display control unit 52 positions the bar 39 at the reference position R in the coaching region 37 of FIG. 2(*b*) without extending the bar 39. The first display control unit 51 displays the second color as the background color 33 of the first display unit 13 of FIG. 2(*a*) during the idling operation.

On the other hand, when the idle-stop is being performed, it is preferable that the first display control unit 51 displays the first color as the background color 33 of the first display unit 13. The second display control unit 52 may position the bar 39 at the reference position R without extending the bar 39.

Thus, if a transition is made from the idling-operation that is the idle-stop to the idling operation that is not the idle-stop, the first, display control unit 51 changes the background color 33 from the first color to the second color. A driver can recognize whether the idling operation that consumes fuel is being performed by visually recognizing the background color 33.

In this embodiment, the idling score is calculated based on the duration of the idling operation. Alternatively, the idling score may be calculated based on another operating state parameter. For example, the idling score may be calculated based on the fuel consumption (which can be calculated based on a fuel injection amount) during the idling operation. The idling score may be decreased from the initial value as the fuel consumption amount increases.

The term "driving operation" in the description may be also used for an operation for causing the vehicle to stop such that the engine is in the idling operation state.

Integration of Score and Calculation of Average Score

Referring back to FIG. 4, an integration unit 47 integrates, at predetermined time intervals, the accelerator score calculated by the accelerator operation scoring unit 43, the brake score calculated by the brake operation scoring unit 44, and the idling score calculated by the idling operation scoring unit 45. In this embodiment, the integration is performed in each driving cycle that is a cycle from the engine start to the engine stop of the vehicle (that is, from the turn-on of the ignition to the turn-off of the ignition). Specifically, the integrated score value is set to zero at the start of each driving cycle, and then the accelerator score, brake, score, and idling score calculated during the driving cycle are integrated until the driving cycle is ended.

An average score calculating unit 48 divides the score thus integrated by the integration unit 47 by an elapsed time from the start of the driving cycle. Thus, an average value of the integrated score value from the start of the driving cycle to the present time is obtained. The average value is referred to as an average score. The average score represents an average of the fuel efficiency state from the start of the diving cycle to, the present time. A higher average score indicates that a more fuel-efficient driving operation is performed. In this embodiment, every time the average score is calculated, the calculated average score is sequentially stored in, for example, a ring buffer provided in the memory of the control unit 40.

Figure 11:
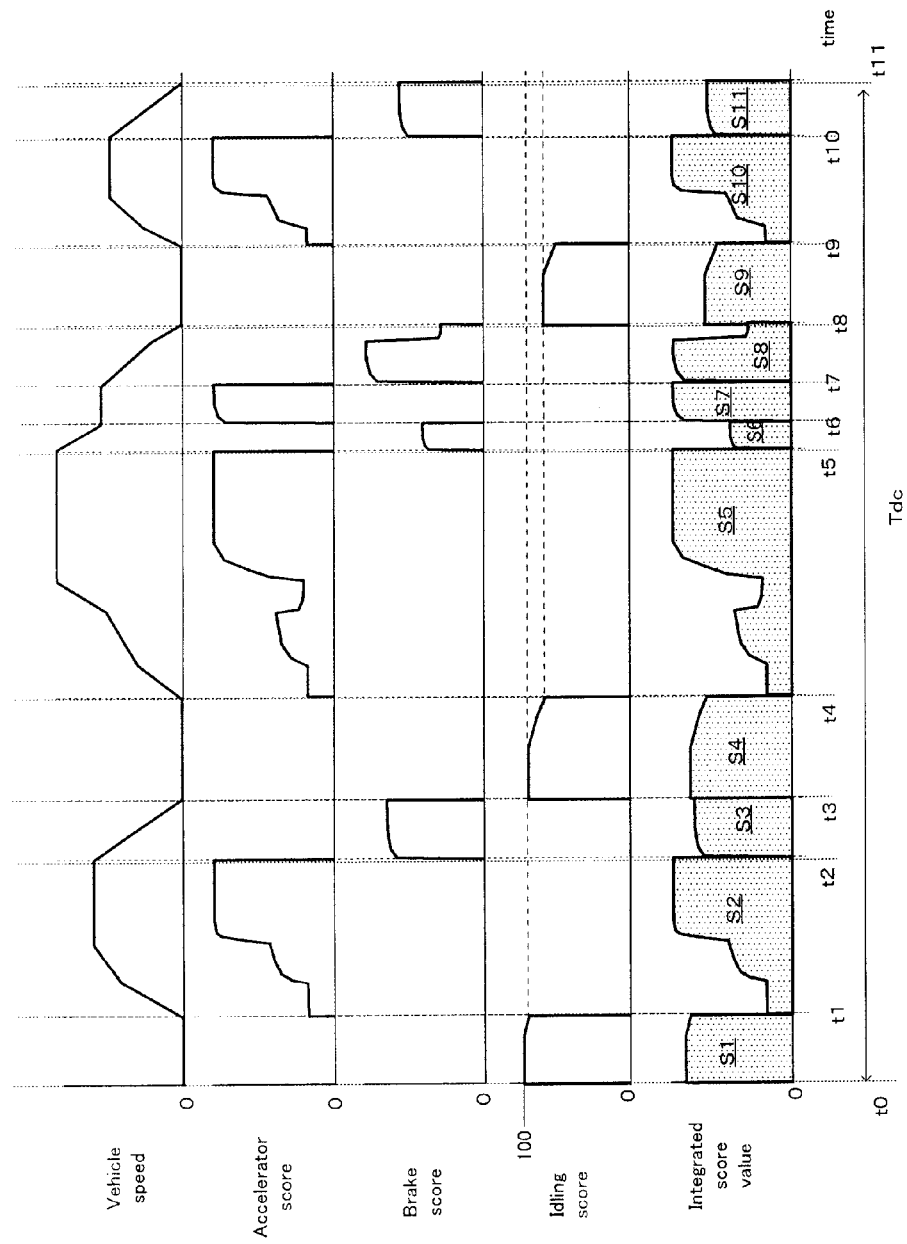
FIG. 11 illustrates an example of a transition of a score according to each driving operation and an integrated value of the score in an embodiment of the invention.

Here, a technique for integrating the score and calculating the average, score will be more specifically described with reference to FIG. 11. At time t0, the ignition is turned on to start the driving cycle. An idling operation is started along with the start of the driving cycle. An initial value (for example, 100 points) is set in the idling score. As described above with reference to FIG. 10, after a predetermined time has elapsed since the idling operation was started, the idling score is decremented with time. At time t1, the idling operation is stopped. An accelerator operation is performed by, for example, a driver depressing the accelerator pedal, to increase the vehicle speed. As described above, the accelerator score is calculated at predetermined time intervals while the accelerator operation is being performed. At time t2, the accelerator operation is stopped. A brake, operation is started by, for example, the driver depressing the brake pedal. As described above, the brake score is calculated at predetermined time intervals while the brake operation is being performed. At time t3, the brake operation is stopped. The vehicle speed is zero to stop the vehicle. Idling operation is started again. After the predetermined time has elapsed, the decrement from the previous idling score is started. The decrement process is repeated with time. At time t4, an accelerator operation is started again.

The integrated score value is zero at time t0 at which the driving cycle is started. One of the accelerator score, brake score, and idling score is calculated at each time point from t0 to t11 at which the driving cycle is ended. Every time any score is calculated, the score is added to the previous integrated score value to calculate the current integrated score value. The "integrated score value" in the figure shows a conceptual image of this integration process. The idling score is integrated between times t0 and t1, which is expressed by an area S1. The accelerator score is integrated between times t1 and t2, which is expressed by an area S2. At time t2, the integrated score value is S1+S2. The brake score is integrated between times t2 and t3, which is expressed by an area S3. At time t3, the integrated score value is S1+S2+S3.

Every time the integration process is performed, the integrated score value is divided by an elapsed time from time t0 at which the driving cycle is, started to the present time (the elapsed time can be measured with a timer and expressed by seconds) to calculate the average score. For example, at time t2, the average score is calculated by (S1+S2)/(t2−t0).

The average score at the end of one driving cycle is calculated by dividing the integrated score value calculated in the driving cycle by a time length Tdc of the driving cycle (as described above, the time length can be measured with a timer and expressed by seconds). In the example of the figure, the average score at the end of the driving cycle is calculated by (S1+S2+ . . . +S11)/Tdc. Accordingly, at the end of the driving cycle, a score per unit time (for example, one second), for the driving cycle is calculated, which is referred to as a total score. The total score represents an average of the fuel efficiency state over the driving cycle. The total score is stored in the memory of the control unit 40.

Figure 12:
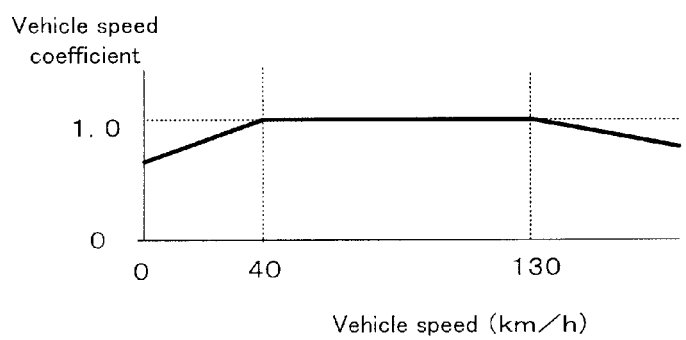
FIG. 12 illustrates a vehicle speed coefficient table in an embodiment of the invention.

It is preferable that the accelerator score is corrected with a vehicle speed. The correction technique will be specifically described. The operating state detecting unit 41 detects the vehicle speed every time the accelerator score is calculated. The vehicle speed can be, detected with a vehicle speed sensor that is included in the various sensors 65 (FIG. 1). Based on the detected vehicle speed, a corresponding vehicle speed coefficient is determined by referring to a map as shown in FIG. 12. When the vehicle speed is equal to or less than a predetermined lower threshold (for example, 40 km/h), and when the vehicle speed is equal to or greater than a predetermined higher threshold (for example, 130 km/h), the vehicle speed coefficient is set to a value smaller than one. The accelerator score is multiplied by the determined vehicle speed coefficient to calculate the corrected accelerator score. The integration is performed on the corrected accelerator score. Accordingly, in the example of FIG. 11, the area such as S2 and S5 is the integrated value of the corrected accelerator score. The average score and the total score as described above are calculated using the integrated value thus calculated.

Thus, when the vehicle speed is excessively low or high, the accelerator score is calculated to be a smaller value. For example, an excessively low vehicle speed state continues during traffic jams. In such a case, even if the accelerator score is calculated as a higher value, it cannot be said that the accelerator score correctly reflects the driving skill regarding the fuel efficiency. Therefore, in the case of the excessively low vehicle speed, the accelerator score value is corrected with the vehicle speed coefficient smaller than one in order to prevent a higher accelerator score value from being calculated. On the other hand, because an excessively high vehicle speed possibly causes the deterioration of the fuel efficiency as described above; the accelerator score value is corrected with the vehicle speed coefficient smaller than one in order to suppress the accelerator score value.

Every time the average score is calculated, the second display control unit 52 of FIG. 4 converts the average score into the number of leaves and displays the leaves in the score display region 35 of FIG. 2(*b*). In this embodiment, the average score has an upper limit of 100 points as shown in the maps of FIGS. 7 and 9. In a case where ten leaves can be displayed, one leaf corresponds to 10 points. The average score of FIG. 2(*b*) indicates 50 points. When the average score that is not divisible, by 10 is calculated, the average score is rounded off to the nearest ten. For example, the average score of 55 points as shown in FIGS. 7 and 9 is round off to 60 points and then converted into the number of leaves. Alternatively, only rounding-up or only rounding-down may be performed. By visually recognizing the number of leaves displayed in the score display region 35 of the second display unit 15, a driver can recognize the state of fuel efficiency obtained by his/her driving operation in the current driving cycle whenever needed.

In this embodiment, the score value is expressed by the number of leaves in the score display region 35. Such graphics display makes it easy for a driver to recognize the score value. As shown in FIG. 2(*b*), five "stems" are displayed in the score display region 35. A driver easily and visually recognizes that 10 leaves indicate the perfect score. Because the current number of leaves is five; the driver can easily visually recognize that the current score value is a half of the perfect score. Thus, it is preferable that not only the current score value but also the perfect score are displayed so as to be easily and visually recognized.

Alternatively, a display form for the score may be arbitrarily set. For example, the score may be displayed by graphics other than the leaf (a simple rectangle or circle may be used). Or, the score value may be displayed by a numerical value (for example, the number "50" may be displayed). In such a case; the perfect score value may be displayed together with the current score value.

In addition to the display of the average score of FIG. 2(b), other information such as a travel distance from the start of the current driving cycle to the present time may be displayed on the second display unit 15.

In this embodiment, the scores is calculated for each of the accelerator operation, the brake operation, and the driving operation leading to the idling operation. Alternatively, the score calculation may be performed for only one or two of these three types of driving operation, although the bar 39 and/or the background color 33 are displayed for all types of driving operation. In this embodiment, the score for all the accelerator operation, the brake operation, and the driving operation leading to the idling operation is integrated to calculate the average score. Alternatively, the score integration may be performed for only one or two of these three types of driving operation to calculate the average value (temporal average). For example, only the accelerator score is integrated to calculate the integrated value of the accelerator score. The accelerator average score is calculated by dividing the integrated value of the accelerator score by the time during which the accelerator operation is performed. The accelerator average score may be displayed. The brake average score and the idling average score may be calculated for the brake score and the idling score, respectively.

Calculation of Lifetime Score

As described above, the total score represents the average of the fuel efficiency state for each driving cycle. The total score indicates whether a fuel-efficient driving operation is performed in the driving cycle. A lifetime score is an integrated value of the total score (that is, a score obtained by accumulating the total score). The lifetime score indicates the level of driver's driving skill regarding the fuel efficiency. A technique for calculating the lifetime score will be described.

Figure 13:
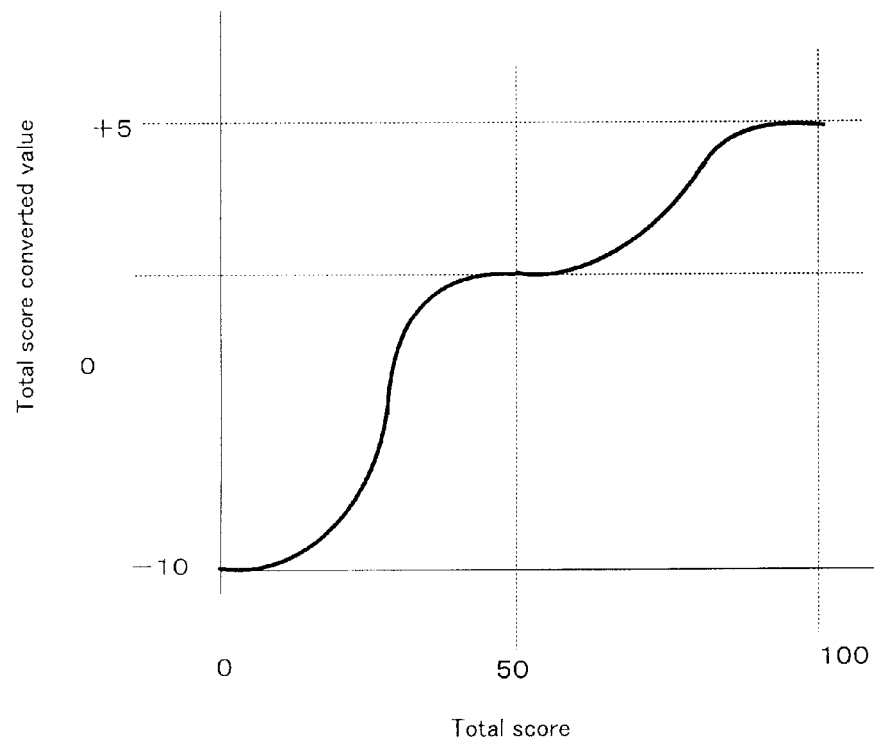
FIG. 13 illustrates a map that is used for converting a total score in a driving cycle into a total score converted value in an embodiment of the invention.

Every time a driving cycle is ended, a lifetime score-calculating unit 49 of FIG. 4 converts the total score of the current driving cycle into a total score converted value by referring to a map as shown in FIG. 13. The map may be pre-stored in the memory of the control unit 40. Because the total score equal to or greater than 50 points indicates a fuel-efficient driving operation, the total score equal to or greater than 50 points is converted into the total score converted value having a positive value. Because the total score less than 50 points does not still indicate a fuel-efficient driving operation, the total score less than 50 points is converted into the total score converted value having a negative value.

In this embodiment, the map is configured such that changes in the total score converted value are smaller near the total scores of zero, 50, and 100. In doing so, the total score can be converted into the total score converted value in such a manner as to more correctly effect the level of the diving skill regarding the fuel efficiency. Alternatively, the total score converted-value may linearly change with changes in the total score.

In this embodiment, the absolute value of the maximum value (in this example, +5) differs from the absolute value of the minimum value (in this example, −10) in the total score converted value. This is done so as to make a decreasing amount greater than an increasing amount for the lifetime score (described later), thereby allowing the driving skill of a driver to be more steadily improved. Alternatively, the maximum value and the minimum value may be set such that the both values have the same absolute value.

In this embodiment, the total score converted value is expressed by an integer. Accordingly, when the total score converted value corresponding to the total score is a decimal, the total score converted value is rounded off to the nearest integer. Alternatively, in a case where the total score expressed by the number of "leaves" as shown in FIG. 2(b) is used, that is, in a case where the total score is expressed in units of 10, the total score converted values (expressed by integer) corresponding to the total scores of 0, 10, 20, . . . , 100 may be defined in a table and stored in the memory.

Alternatively, the above conversion may not be performed. In such a case, it is preferable that the total score is established in a range from a negative value to a positive value (for example, a range from −50 points to 50 points). In doing so, the lifetime score (described later) can be increased and decreased according to the driving skill regarding the fuel efficiency. For example, the range from −50 to 50 of the total score may be linearly brought into correspondence with 0 to 10 leaves such that the graphics as described above is displayed.

Preferably, the lifetime score calculating unit 49 corrects the determined total score converted value by multiplying by the travel distance of the current driving cycle. The longer the travel distance, the more the driving experience. Multiplying by the travel distance allows the lifetime score to reflect the driving experience. Accordingly, the total score converted value of the current driving cycle is calculated by "total score converted value determined from the map of FIG. 13"×"travel distance (km) of current driving cycle."

It is preferable that an upper limit is set for the total score converted value calculated for every driving cycle. In this embodiment, 200 points is set as the upper limit of the total score converted value corrected by the travel distance. This is done so as to encourage a driver to develop the driving skill for improving the fuel efficiency while gradually increasing the lifetime score.

The lifetime score calculating unit 49 adds the total score converted value determined in the current driving cycle to the previous value of the lifetime score to calculate the current value of the lifetime score. The initial value of the lifetime score is set to zero. The lifetime score is updated every time the driving cycle is performed. The lifetime score value is increased as the level of the driving skill regarding the fuel efficiency is improved.

Figure 14:
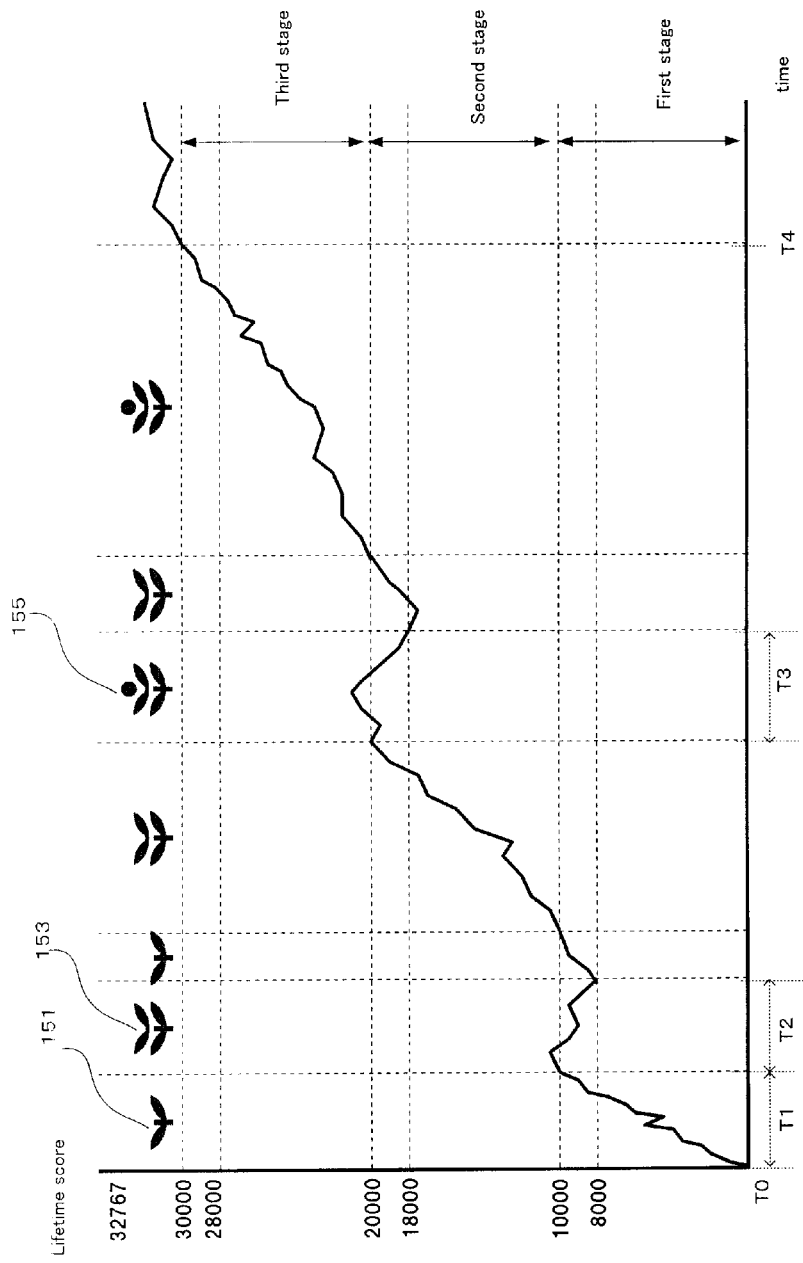
FIG. 14 illustrates an example of a transition of a lifetime score in an embodiment of the invention.

FIG. 14 shows an example of a transition of the lifetime score. The horizontal axis indicates time. The vertical axis indicates the lifetime score value.

In this embodiment, three stages are established according to the lifetime score value. A first stage ranges from zero to 9999 points in the lifetime score value. A second stage ranges from 10000 to 19999 points. A third stage ranges from 20000 to 29999 points. As the driving skill regarding the fuel efficiency is improved, the lifetime score rises from the first stage through the third stage. On the other hand, because the total score converted value may have a negative value as described above, the lifetime score may be reduced from the third stage through the first stage.

The first stage is a so-called beginner level where a driver learns a basic operation of the accelerator and intake operations in order to improve the fuel efficiency. The second stage is a middle level where a driver learns a driving operation in order to further improve the fuel efficiency. The third stage is an expert level wherein a driver learns a more perfect driving operation from the viewpoint of fuel efficiency.

At time T0, the lifetime score has the initial value of zero. It can be arbitrarily determined when to initialize the lifetime to zero. For example, the initial value may be set in the lifetime score in response to a predetermined operation performed on the display screen by a driver.

In a time period T1, the lifetime score is in the first stage. As shown by reference numeral 151, one row of leaves is displayed in the score display region 35 of FIG. 2(b) (which indicates the average score as described above). In a time period T2, the lifetime score temporarily enters the second stage. In the second stage, as shown by reference numeral 153, two rows of leaves are displayed in the score display region of FIG. 2(b). In a time period T3, the lifetime score enters the third stage. In the third stage; as shown by reference numeral 155, a flower is displayed together with two rows of leaves in the score display region 35 of FIG. 2(b). Thus, the score value is expressed by the number of leaves displayed in the score display region 35, and the form of the leaves is changed between the stages. Therefore, a driver can recognize which stage he/she exists in. Because the form of the leaves grows as the lifetime score rises between stages, the driver easily and visually recognizes the improvement of the driving skill.

The shape of the graphics 151 to 155 displayed in the score display region 35 is only an example. Graphics having another shape may be used. Alternatively, the stage may be expressed by a character or a numerical value instead of the graphics.

Preferably, the integration (accumulation) of the lifetime score is prohibited (canceled) when a predetermined condition is met for the driving cycle. In this embodiment, the following conditions are used (1) when the maximum vehicle speed does not reach a predetermined value during the driving cycle, and (2) when the travel distance does not reach a predetermined value during the driving cycle. The predetermined value of (1) is a predetermined low-vehicle speed, which is, for example, 7 km/h. The predetermined value of (2) is a predetermined short distance, which is, for example, 100 m. When at least one of the conditions (1) and (2) is met, the total score calculated in the driving cycle is not added to the previous value of the lifetime score (that is, not integrated). Alternatively, the integration may be prohibited when both the conditions (1) and (2) are met.

Even if the driving cycle where the above condition is met is performed many times, the driving skill regarding the fuel efficiency is not improved. For example, a driving cycle where low-speed traveling such as 7 km/h or short-distance traveling such as 100 m is performed is hardly considered as a driving cycle where the vehicle travels on a normal road, and it is difficult to appropriately evaluate the driver's driving skill regarding the fuel efficiency. Accordingly, the integration of the lifetime score for a driving cycle that is difficult, to be considered as a normal travel is prohibited. In doing so, it is possible to calculate the lifetime score having a value, that more appropriately reflects the driving skill regarding the fuel efficiency.

After the ignition is turned off, the second, display control unit 52 of FIG. 4 displays the total score and lifetime score that are calculated in the current driving cycle on the second display unit 15. In this embodiment, the total score and lifetime score are displayed over a predetermined period (for example, six seconds) after the ignition is turned off.

FIG. 15(a) shows an example of this display, which is presented instead of the display of FIG. 2(b) after the ignition is turned off. A region 71 indicates the total score. The display form of the region 71 is similar to the score display region 35 of FIG. 2(b). The total score is converted into the number of leaves, which is displayed in the region 71. A region 73 indicates the current stage and lifetime score. A region 73a corresponds to the first stage, a region 73b corresponds to the second stage, and a region 73c corresponds to the third stage. One row of leaves is displayed to indicate the first stage, two rows of leaves are displayed to indicate the second stage, and two rows of leaves with a flower are displayed to indicate the third stage.

The length in the horizontal axis direction of each regions 73a to 73c corresponds to a score range of each stage (in this embodiment, each score, range is 10000 points). A bar 75 indicates the lifetime score value. For example, when the lifetime score is 5000 points and is in the first stage, the bar 75 extending to the center of the region 73a of the first stage is displayed as shown in FIG. 15(a). Thus, after turning off the engine, a driver can recognize the evaluation result of the driving operations in the current driving cycle from the viewpoint of fuel efficiency and which level his/her lifetime score, that is, his/her driving skill regarding the fuel efficiency reaches.

FIGS. 15(b) and 15(c) show the displays used for the second stage and third stage, respectively. As described above, one row of leaves is displayed in the first stage. In contrast, two rows of leaves are displayed in the second stage. A flower is displayed in addition to two rows of leaves in the third stage. Thus, a driver can visually recognize which stage he/her belongs to and which level the lifetime score exists in. The lifetime score and the stage represent the level of the driver's driving skill regarding the fuel efficiency. It can be easily seen that the level of the driving skill rises as the number of leaves is increased to produce a flower.

Figure 15:
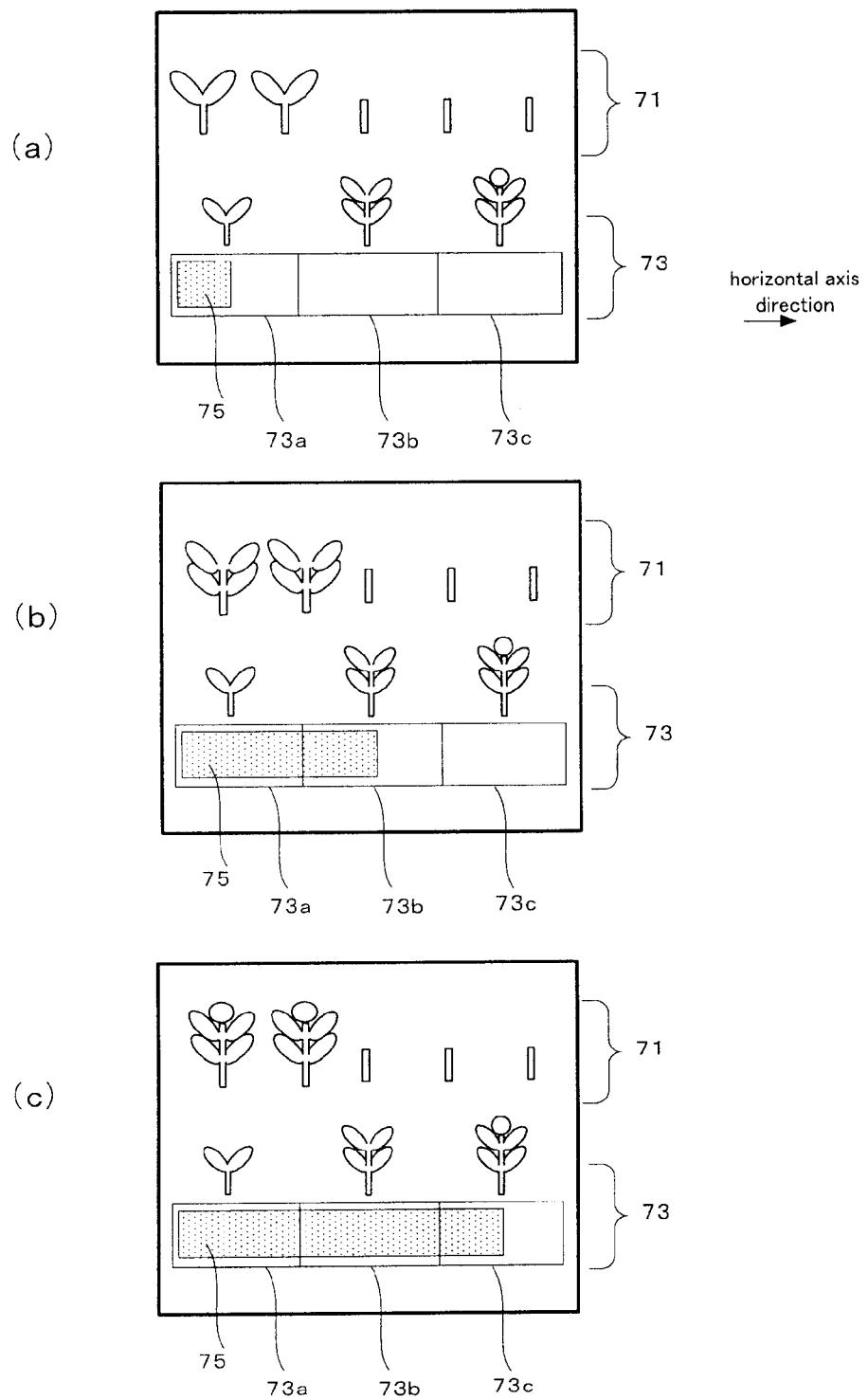
FIG. 15 illustrates a display on a second display unit when ignition is turned off in an embodiment of the invention.

Other information such as, a travel distance in the current driving cycle may be displayed on the screen as shown in FIG. 15.

Figure 16:
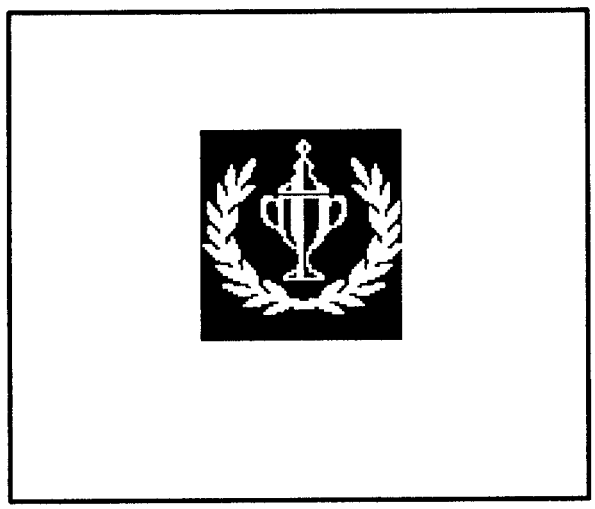
FIG. 16 illustrates a display on a second display unit when a stage is changed in an embodiment of the invention.

In this embodiment, when the lifetime score rises from the first stage to the second stage in the current driving cycle, and when the lifetime score rises from the second stage to the third stage in the current driving cycle, the second display control unit 52 further displays a screen as shown in FIG. 16 on the second display unit 15 immediately before the screen as shown in FIG. 15 is displayed after the ignition is turned-off. This is done so as to show a driver that the lifetime score has gone on to the next higher stage in the current driving cycle. Thus, the driver can recognize a rise in his/her level. The display of FIG. 16 is only an example. A rise in the driver's level may be expressed by other graphics or symbol. Or, the driver may be notified of a rise in his/her level by characters. A display form indicating a change from the first stage to the second stage may differ from a display form indicating a change from the second stage to the third stage. Further, the driver may be notified of a rise in his/her level by sound.

Because the lifetime score value may be decreased, the lifetime score may move from the third stage to the second stage or from the second stage to the first stage. In such a case, a driver may be notified of a fall in his/her level. The notification of a fall in the driver's level may be similarly made as described above. The driver may be notified of a fall in his/her level by any graphics, symbol, and/or characters or by sound.

The lifetime score may be established for every vehicle or every driver. In the latter case, the lifetime score may be established for every driver using, for example, a keyless entry system. In the keyless entry system, a user presses a button provided in a portable device to transmit an authentication code to an in vehicle authentication instrument (which may be implemented in the Electronic Control Unit (ECU)). A door of the vehicle is unlocked when a result of the comparison between the authentication code and a reference code recorded in the authentication instrument meets a predetermined condition. In this case, the lifetime score is stored in the memory of the control unit 40 of FIG. 4 for every authentication code. The average score and the total score in each driving cycle may be stored for every authentication code. The control unit 40 receives the authentication code from the authentication instrument when the comparison result meets the predetermined condition. The lifetime score calculating unit 49 reads the lifetime score corresponding to, the authentication code from the memory, and calculates the current value of the lifetime score by adding the total score converted value that is calculated in the current driving cycle and corrected by the travel distance. As described above with reference to FIG. 15, the calculated lifetime score and the corresponding stage are displayed after the ignition is turned off. Here, a display for notifying a driver of the authentication code may be performed. Further, a correspondence between the authentication code and driver's name may be stored in the memory of the control unit 40. The driver's name may be displayed when the display of FIG. 15 is performed. In a case where a plurality of portable devices having different authentication codes are provided for one vehicle, each driver uses the different portable device, which allows the lifetime score to be established for every driver.

In a case where a plurality of portable devices are provided for one vehicle, there is also a system where a code for identifying a portable device is added to the authentication code and then transmitted to the authentication instrument. In such a case, the control unit 40 may establish the lifetime score for each value of "authentication code+portable device identification code". Each driver uses, the different portable device, which allows the lifetime score to be established for every driver in a similar way.

A smart entry system or smart start system may be utilized instead of the keyless entry system. In the smart entry system, an authentication code request signal is transmitted from the in vehicle authentication instrument to the portable device when a trigger condition such as a user's touch on a door handle of the vehicle is met. The portable device transits the authentication code to the in-vehicle authentication instrument in response to the request signal, and the door is unlocked when the result of the comparison between the authentication code and a reference code recorded in the authentication instrument meets a predetermined condition. In the smart start system, the authentication code request signal is transmitted from the in-vehicle authentication instrument to the portable device when a driver switches an ignition knob. The portable device transmits the authentication code to the in-vehicle authentication instrument in response to the request signal. The engine is permitted to start when the result of the comparison between the authentication code and a reference code recorded in the authentication instrument meets a predetermined condition. In both the systems, as with the keyless entry system, the control unit 40 can establish the lifetime score for every driver to calculate the lifetime score using the authentication code (or "authentication code+portable device identification code").

Alternatively, a driver may perform some operation to cause the control unit 40 to recognize the driver. For example, a code (or name) for identifying the driver is pre-stored in the memory of the control unit 40. The lifetime score is stored in association with each identification code. In response to the driver inputting the his/her identification code on the display apparatus 17, the control unit 40 reads the lifetime score corresponding to the identification code from the memory, which allows the lifetime score to be calculated for every driver.

As described above, the lifetime score reflects the level of driver's driving skill regarding the fuel efficiency. Accordingly, even if the vehicle is shared by a plurality of drivers, the lifetime score is calculated and displayed for every driver, such that the driving skill regarding the fuel efficiency can be improved for every driver.

Level (Stage) Control

Figure 19:
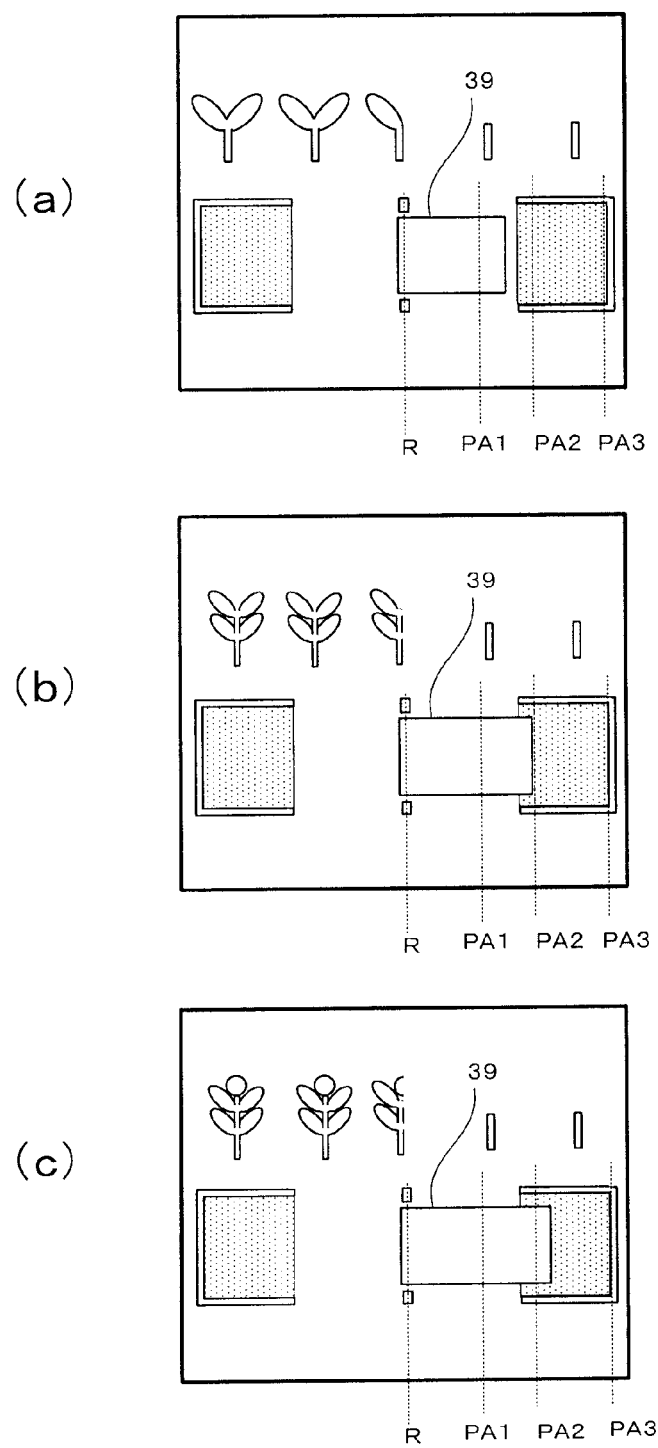
FIG. 19 is a view for explaining changes in a bar length between first, second, and third stages according to an accelerator operation in an embodiment of the invention.
Figure 20:
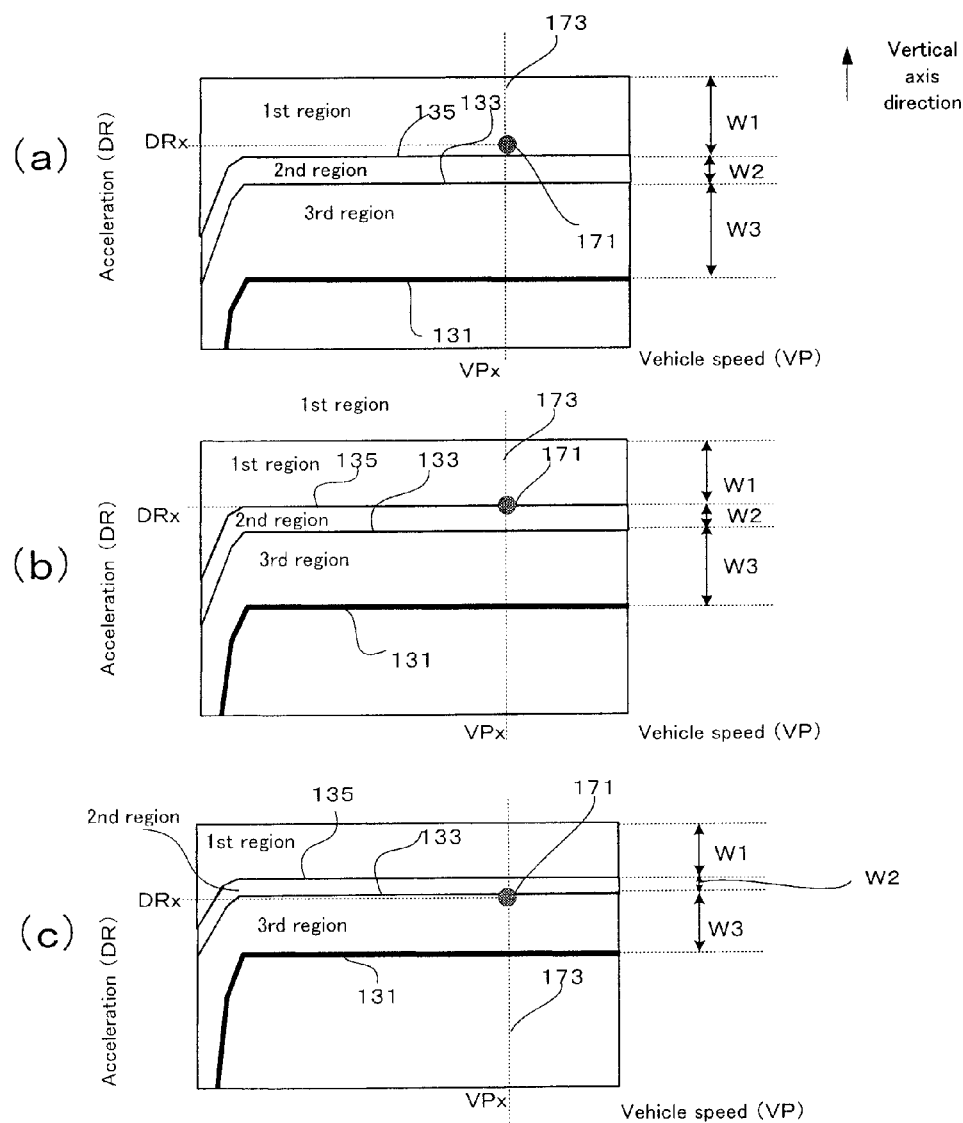
FIG. 20 illustrates maps used for a brake operation for first, second, and third stages in an embodiment of the invention.

In this embodiment, in order to improve the driving skill regarding the fuel efficiency, the accelerator score and the brake score are more strictly marked (graded) as the lifetime score rises from the first stage through the third stage. This technique for the accelerator operation will be described with reference to FIGS. 17 to 19, and for the brake operation will be described with reference to FIGS. 20 to 22.

Figure 17:
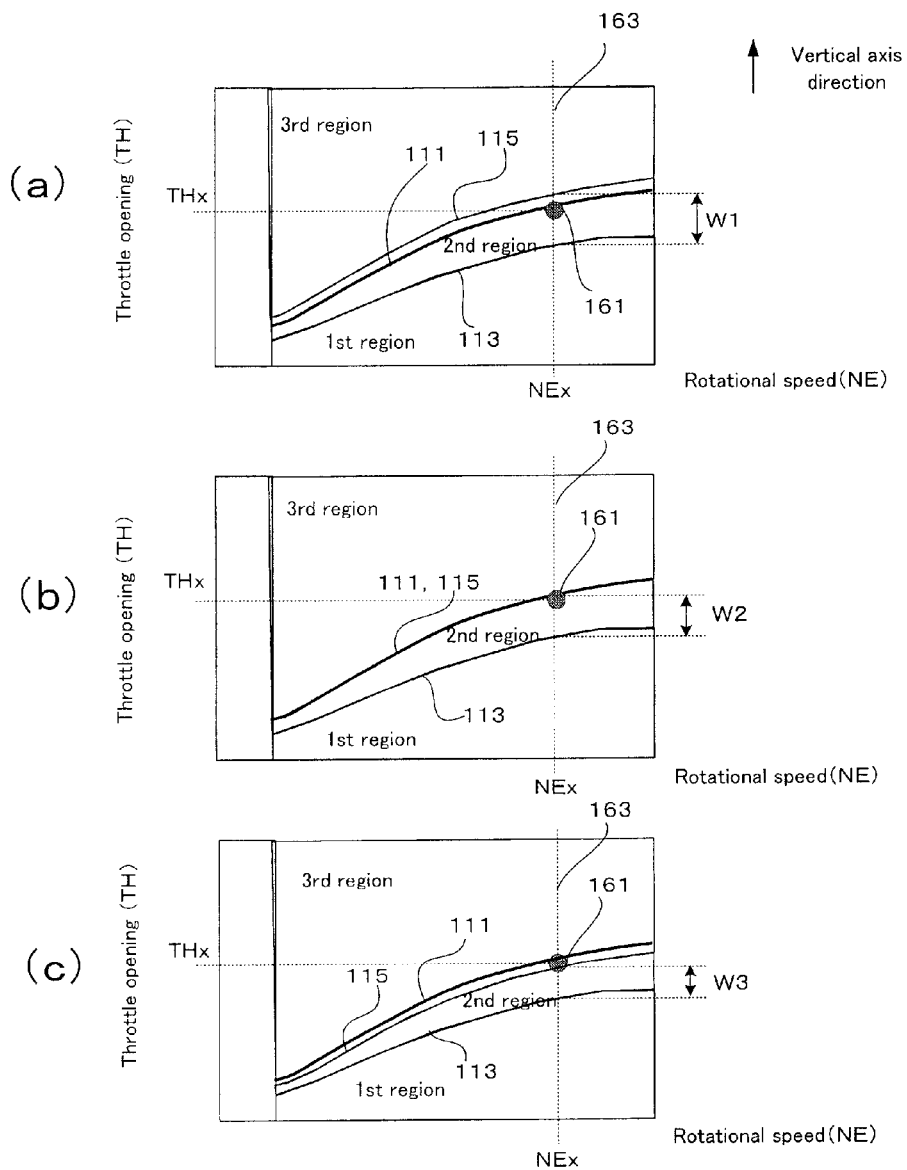
FIG. 17 illustrates maps used for an accelerator operation for first, second, and third stages in an embodiment of the invention.

FIG. 17 shows maps used for the accelerator operation. FIG. 17(*a*) shows the same, map as FIG. 5(*a*). The line 111 indicating BSFC and the lines 113 and 115 partitioning the first to third regions are shown. This map is used for the first stage.

FIG. 17(*b*) shows a map for the second stage, and FIG. 17(*c*) shows a map for the third stage. The size of the first region in the maps for the second and third stages is the same as the size of the first region in the map for the first stage. Although the line 111 indicating BSFC is shown for the purpose of reference, the position of the line 111 is not changed between the stages. However, from the first through third stages, a width in the vertical axis direction of the second region is narrower while a width in the vertical axis direction of the third region is wider. That is, in the map of FIG. 17(*b*), although the line 113 defining the bottom of the second region is located in the same position as the map for the first stage, the line 115 defining the top of the second region overlaps with the line 111 of BSFC. As a result, as compared to the first stage, the second region is narrower while the third region is wider.

In the map of FIG. 17(*c*), although the line 113 defining the bottom of the second region is located in the same position as the map for the first stage, the line 115 defining the top, of the second region is located below the line 111 of BSFC. As a result, as compared to the second stage, the second region is further narrower while the third region is further wider.

These maps may be pre-stored in the memory of the control unit 40. The accelerator operation scoring unit 43 determines which of the first through third stages the lifetime score belongs to, and selects a map for the stage to which the lifetime score belongs.

As described above with reference to FIG. 5(*a*), the accelerator operation scoring unit 43 performs the allocation between the first to third regions of the selected map and the acceleration region Ar. That is, the unit 43 allocates the throttle opening range from zero to TH1 determined based on the detected engine rotational speed NE to the range from the position R to the position PA1 in the accelerator region Ar, the range from TH1 to TH2 to the range from the position PA1 to the position PA2, and the range from TH2 to TH3 to the range from the position PA2 to the position PA3. Then, as described above with reference to FIG. 5(*a*), the accelerator operation scoring unit 43 determines the length of the bar 39 and the accelerator score value based on the detected operating state.

Figure 18:
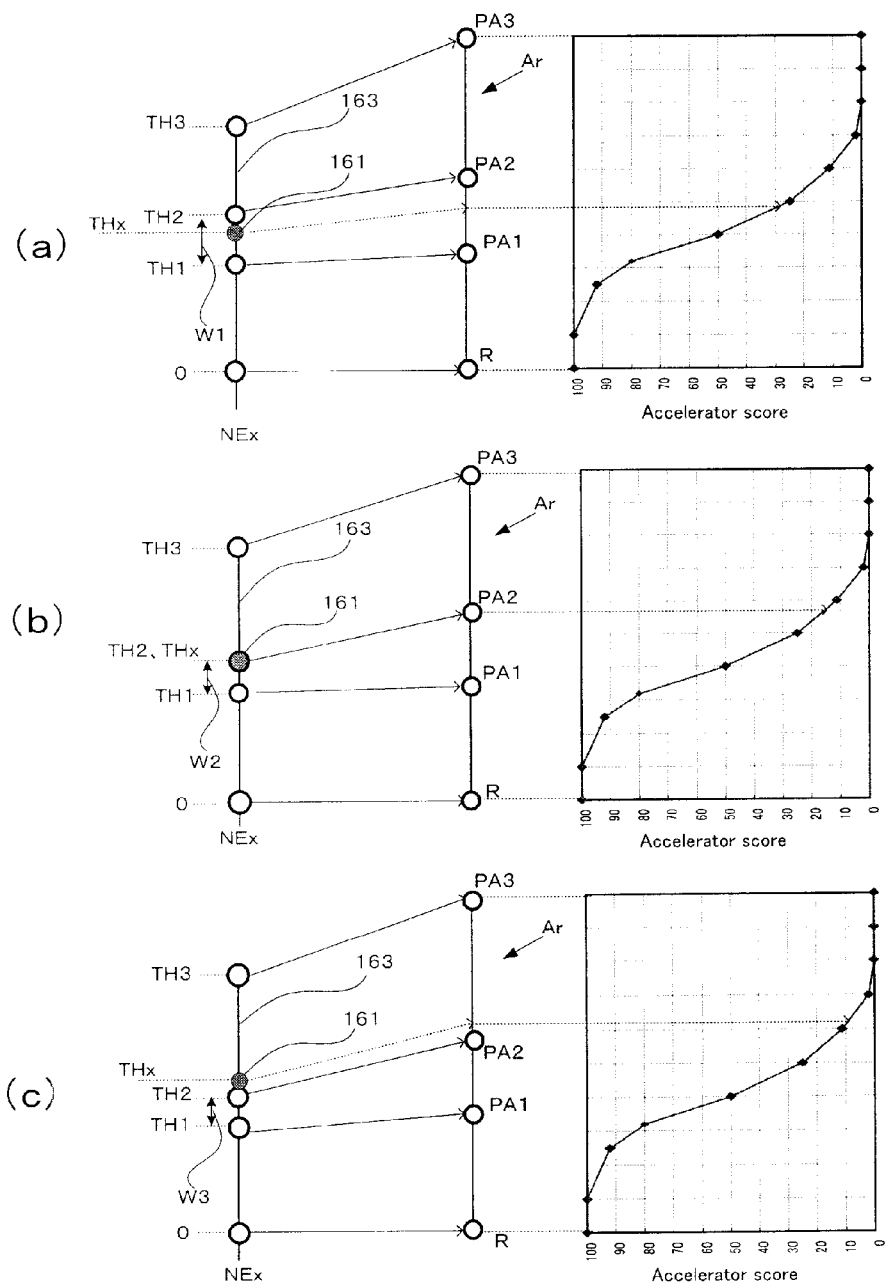
FIG. 18 illustrates changes in allocation between an accelerator score and an operating state between first, second, and third stages in an embodiment of the invention.

As an example, FIG. 18 shows the allocation for each stage for an operating state 161 where the detected engine rotational speed is NEx and the detected throttle opening is THx. FIGS. 18(*a*) to 18(*c*) correspond to FIGS. 17(*a*) to 17(*c*), respectively. In the left side of FIG. 18, a line 163 in the vertical axis direction indicates the engine rotational speed NEx of FIG. 17. TH1 and TH2 indicate throttle openings corresponding to intersections between the line 163 and the lines 113 and 115 in the vertical axis direction. TH3 indicates the maximum throttle opening. The throttle opening THx corresponding to the operating state 161 is shown by a black circle. On a center line in the vertical axis direction of FIG. 18, the reference position R, position PA1, position PA2, and position PA3 of the acceleration region Ar, as described with reference to FIG. 5(b), are arranged in the vertical axis, direction. The reference position R, position PA1, position PA2, and position PA3 are fixed as described above. Maps in the right side of FIG. 18 are the same as FIG. 7, and show the accelerator score for each position in the acceleration region Ar.

The width of the second region is narrower (W3<W2<W1) as the lifetime score rises from the first stage through the third stage, thereby decreasing the value TH2. Therefore, the range from TH1 to TH2 allocated to the range from PA1 to PA2 changes, and the range from TH2 to TH3 allocated to the range from PA2 to PA3 changes. That is, between the stages, a ratio of (range from TH1 to TH2):(distance between PA1 and PA2) changes, and a ratio of (range from TH2 to TH3): (distance between PA2 and PA3) changes. Because a correspondence between each position in the acceleration region Ar and each accelerator score value is 1:1, a ratio of the throttle opening range from TH1 to TH3 to the corresponding score value range changes between the stages.

In this embodiment, a ratio in the first region does not change. Alternatively, the ratio may be changed in the first region. As described above; because the map may be created based on another operating state parameter, the ratio for each region may be established according to an operating state parameter by which the map is created.

When the selected map is the map for the first stage of FIG. 17(a), the operating state 161 is located in the second region as shown in FIG. 18(a). Therefore, a position corresponding to the operating state 161 (as described above, representing the length of the bar 39) is between the positions PA1 and PA2. The accelerator score corresponding to this position is about 30 points. FIG. 19(a) shows the bar 39 having a length based on this accelerator score.

When the selected map is the map for the second stage of FIG. 17(b), the operating state 161 is substantially located at the boundary between the second and third regions as shown in FIG. 18(b). The position PA2 substantially corresponds to the operating state 161. The accelerator score corresponding to the position PA2 is about 15 points. FIG. 19(b) shows the bar 39 having a length based on the accelerator score.

When the selected map is the map for the third stage of FIG. 17C, the operating state 161 is located in the third region as shown in FIG. 18(c). A position corresponding to the operating state 161 is between the positions PA2 and PA3. The accelerator score corresponding to this position is about 10 points. FIG. 19(c) shows the bar 39 having a length based on the accelerator score.

Thus, from the first through third stages, the ratio of the throttle opening range from TH1 to TH3 to the corresponding accelerator score value range changes. Accordingly, even if the same accelerator operation is performed, the length of the bar 39 is longer while the accelerator score value is smaller, as the lifetime score rises from the first through third stages. A driver tries to perform the accelerator operation such that the bar 39 does not reach the hatched region, thereby improving the driving skill for improving the fuel efficiency.

Next, the brake operation will be described. FIGS. 20(a) to 20(c) show maps used for the brake operation. The map in FIG. 20(a) is the same as FIG. 8(a), and is for the first stage. In the map of FIG. 20(a), the line 131 indicates the operating state considered as a predetermined sudden brake operation. The lines 133 and 135 partition the first through third regions.

FIG. 20(b) shows a map for the second stage, and FIG. 20(c) shows a map for the third stage. The line 131 is moved upward in the vertical axis direction as the lifetime score rises from the first through the third stages. An amount by which the line 131 is moved upward can be arbitrarily set. Here, in each stage, a ratio among a width W1 in the vertical axis direction of the first region, a width W2 in the vertical axis direction of the second region, and a width W3 in the vertical axis direction of the third region above the line 131 is constant ("width" indicates the width of the region when the vehicle speed is equal to or greater than about 15 km/h as shown in FIG. 8(a)). Accordingly, the width of each region is narrower as the line 131 is moved upward.

These maps may be pre-stored in the memory of the control unit 40. The brake operation scoring unit 44 determines which of the first through third stages the lifetime score belongs to and selects a map for the stage to which the lifetime score belongs.

As described above with reference to FIG. 8(a), the brake operation scoring unit 44 performs the allocation between the first to third regions of the selected map and the brake region Br. That is, the unit 44 allocates the acceleration range from zero to DR1 determined based on the detected vehicle speed VP to the range from the position R to the position PB1 in the brake region Br, the range from DR1 to DR2 to the range from the position PB1 to the position PB2, and the range from DR2 to DR3 to the range from the position PB2 to the position PB3. Then, as described above with reference to FIG. 8(a), the brake operation scoring unit 44 determines the length of the bar 39 and the brake score value based on the detected operating state.

Figure 21:
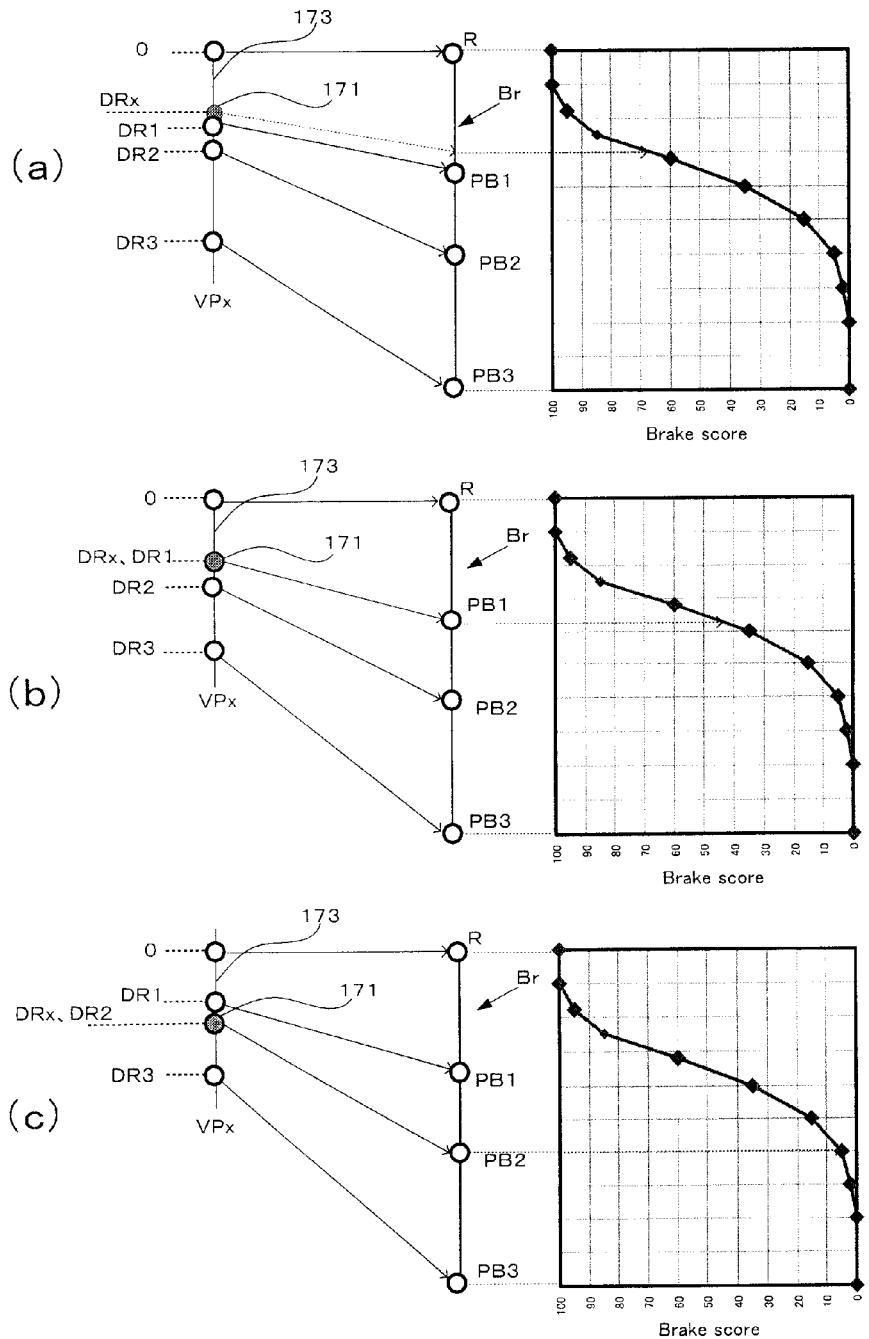
FIG. 21 illustrates changes in allocation between an brake score and an operating state between first, second, and third stages in an embodiment of the invention.
Figure 22:
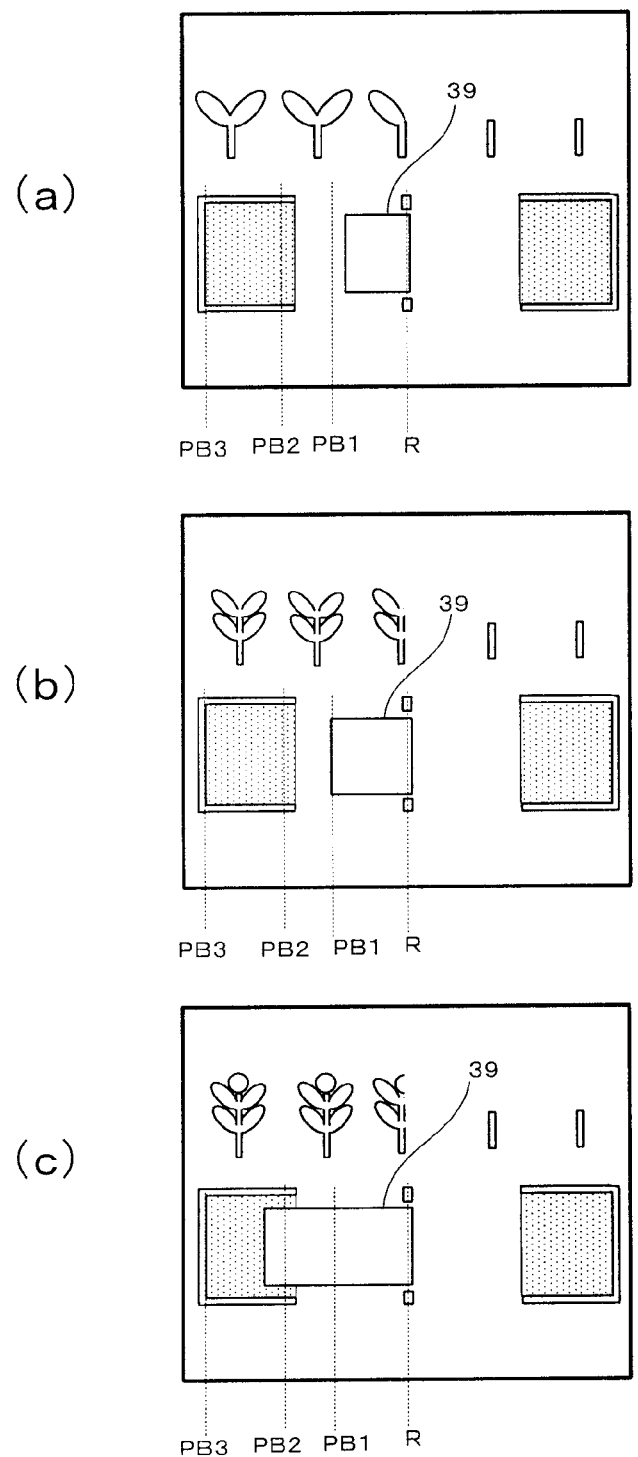
FIG. 22 is a view for explaining changes in a bar length between first, second, and third, stages according to a brake operation in an embodiment of the invention.

As an example, FIG. 21 shows the allocation for each stage for an operating state 171 where the detected vehicle speed is VPx and the detected acceleration is DRx. FIGS. 21(a) to 21(c) correspond to FIG. 20(a) to 20(c), respectively. In the left side of FIG. 20, a line 173 in the vertical axis direction indicates the vehicle speed VPx of FIG. 20. DR1, DR2, and DR3 indicate accelerations corresponding to intersections of the line 173 and the lines 135, 133, and 131 in the vertical axis direction. The acceleration DRx corresponding to the operating state 171 is shown by a black circle. On a center line in the vertical axis direction of FIG. 21, the reference position R, position PB1, position PB2, and position PB3 of the brake region Br, as described with reference to FIG. 8(b), are arranged in the vertical axis, direction. The reference position R, position PB1, position PB2, and position PB3 are fixed as described above. Maps in the right side of FIG. 21 are the same as FIG. 9, and show the brake score for each position in the brake region Br.

Because the width of each region is narrower as the lifetime score rises from the first through third stages, the range from zero to DR1 allocated to the range from R to PB1, the range from DR1 to DR2 allocated to the range from PB1 to PB2, and the range from DR2 to DR3 allocated to the range from PB2 to PB3 change. That is, between the stages, a ratio of (range from zero to DR1):(distance between R and PB1) changes, a ratio of (range from DR1 to DR2):(distance between PB1 and PB2) changes, and a ratio of (range from DR2 to DR3): (distance between PB2 and PB3) changes. Because a correspondence between each position in the brake region Br and each brake score value is 1:1, a ratio of the acceleration range from zero to DR3 to the brake score value range changes between the stages. As described above, because the map may be created based on another operating state parameter, the ratio for each region may be established according to an operating state parameter by which the map is created.

When the selected map is the map for the first stage of FIG. 20(a), the operating state 171 is located in the first region as shown in FIG. 20(a). A position corresponding to the operating state 171 (as described above, representing the length of the bar 39) is between the positions R and PB2. The brake score corresponding to this position is about 70 points. FIG. 22(a) shows the bar 39 having a length based on the brake score.

When the selected map is the map for the second stage of FIG. 20(b), the operating state 171 is substantially located at the boundary between the first and second regions as shown in FIG. 20(b). The position PB1 substantially corresponds to the operating state 171 as shown in FIG. 21(b). The brake score corresponding to the position PB1 is about 45 points. FIG. 22(b) shows the bar 39 having a length based on the brake score.

When the selected map is the map for the third stage of FIG. 20(c), the operating state 171 is substantially located at the boundary between the second and third regions as shown in FIG. 20(c). The position PB2 substantially corresponds to the operating state 171 as shown in FIG. 21(c). The brake score corresponding to the position PB2 is about 5 points. FIG. 22(c)) shows the bar 39 having a length based on the brake score.

Thus, from the first through third stages; the ratio between the acceleration range from zero to DR3 to the corresponding brake score value range changes. Accordingly, even if the same brake operation is performed, the length of the bar 39 is longer while the brake score value is smaller, as the lifetime score rises from the first through third stages. A driver tries to perform the brake operation such that the bar 39 does not reach the hatched region, thereby improving the driving skill for improving the fuel efficiency.

The stage control as described above is applicable to not only the embodiment where the fuel efficiency display of FIG. 2(b) is performed but also the embodiment where the fuel efficiency display of FIG. 2(a) is performed. In the embodiment for the display of FIG. 2(a), a map to which the lifetime score belongs is selected from the maps of FIGS. 17(a) to 17(c) for the accelerator operation, and a map to which the lifetime score belongs is selected from the maps of FIGS. 20(a) to 20(c) for the brake operation. The intensity value of the intermediate color is determined using the selected maps as described above, and the accelerator score and brake score corresponding to the intensity value are determined. Even if the same accelerator operation or brake operation is performed, the background color 33 becomes closer to the second color while the accelerator score value and brake score value are smaller, as the lifetime score rises from the first through third stages. A driver tries to perform the accelerator operation and brake operation such that the background color 33 does not reach the second color, thereby further improving the driving skill for improving the fuel efficiency.

The invention is applicable to a case where another display form of the fuel efficiency is performed (for example, a form in which the accelerator score value and/or brake score value are displayed) instead of the display form of the fuel efficiency shown in FIGS. 2(a) and 2(b). In such a case, a map to which the lifetime score belongs is selected, and the length of the bar or the intensity value of the intermediate color calculated from the selected map may be used as a "key" to determine the score from the map of FIG. 7 or 9.

In the above embodiment, a plurality of stages are established according to the lifetime score value. Alternatively, such establishment may not be made. In, such a case, different maps according to the lifetime score are used as described with reference to FIGS. 17 and 20, and marking the accelerator score and brake score is stricter as the lifetime score is higher. Because the above embodiment has three stages, the three maps corresponding to the stages are prepared. Alternatively, any number of stages may be established. Further, any number of maps may be established for each of the accelerator operation and the brake operation irrespective of the stage setting. The number of maps referred to for the accelerator operation may differ from the number of maps referred to for the brake operation.

In the above embodiment, the lifetime score is calculated by accumulating the average value of the score (average score) in a predetermined period (driving cycle). In doing so, the driving operation regarding the fuel efficiency is easily evaluated for each driving cycle. Alternatively, a value obtained by accumulating the score (accelerator score, brake score, and idling score) calculated at predetermined time intervals may be used as the lifetime score without averaging. Because each score indicates the evaluation of each driving operation regarding the fuel efficiency, the accumulated value for the score represents the level of the driving skill regarding the fuel efficiency. In such a case, the stage control can be performed in a similar way.

Control Flow

Figure 23:
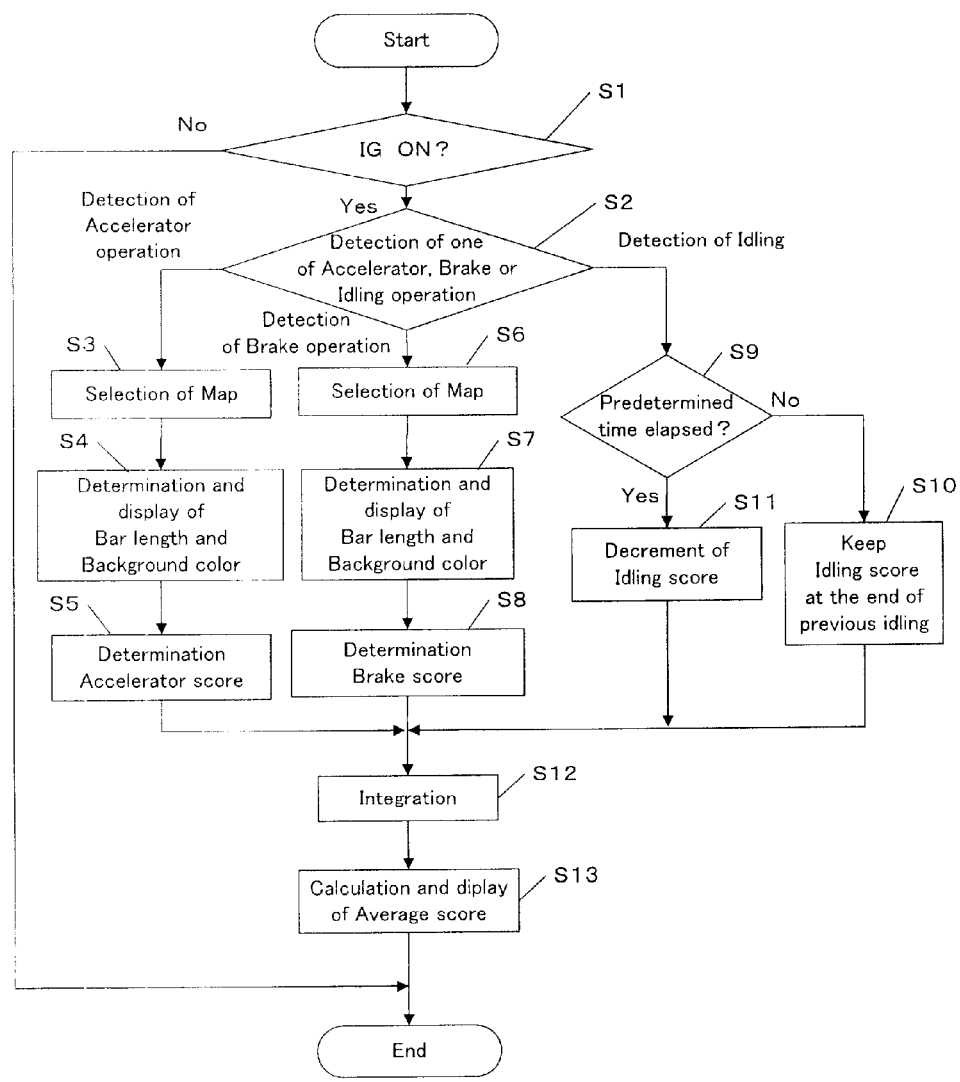
FIG. 23 is a flowchart for displaying a state of fuel efficiency and determining a score according to a driving operation in an embodiment of the invention.

FIG. 23 shows an example of a control process flow, which is executed by the control unit 40, for performing the display indicating a state of fuel efficiency and determining a score indicating the state of fuel efficiency as described referring to the above embodiments. This process is performed at predetermined time intervals (for example, 100 milliseconds).

If the ignition switch is on in step S1, this process is performed. In step S2, one of the accelerator operation, brake operation, and idling is detected.

If the accelerator operation is detected, one of the maps of FIGS. 17(a) to 17(c) is selected from the memory according to the stage to which the current lifetime score value-belongs in step S3. In step S4, the selected map is referred to based on the detected engine rotational speed NE and the detected throttle opening TH to determine and display the length of the bar and/or background color. In step S5, the accelerator score is determined by referring to the map as shown in FIG. 7. As described above, the maps of FIGS. 17(a) to 17(c) have been created based on the engine rotational speed and the throttle opening. Alternatively, these maps may be created based on another operating state parameter. Further, as described above with reference to FIG. 6, a finer gradation control may be performed for the background color.

If the brake operation is detected in step S2, one of the maps of FIGS. 20(a) to 20(c) is selected from the memory according to the stage to which the current lifetime score value belongs in step S6. In step S7, the selected map is referred to based on the detected vehicle speed VP and the detected acceleration DR to determine and display the length of the bar and(or) the background color. In step S8, the brake score is determined by referring to the map as shown in FIG. 9. As described above, these maps of FIGS. 20(a) to 20(c) have been created based on the vehicle speed and the acceleration. Alternatively, these maps may be created based on another operating state parameter. As described above with reference to FIG. 6, a finer gradation control may be performed for the background color.

If the idling operation is detected in step S2, it is determined whether a predetermined time has elapsed from the start of the current idling operation in step S9. If the predetermined time has not elapsed, the idling score value at the end of the previous idling operation state is maintained in step S10. If the predetermined time has elapsed, the idling score is decremented by a predetermined value in step S11. As described above, the idling score at the start of the driving cycle is set to the initial value.

In step S12, the currently determined accelerator score, brake score, or idling score is added to the previous integrated value to calculate the current integrated value. In step S13, the current integrated value is divided by the elapsed time from the start of the driving cycle to calculate the average score. The average score is displayed in the score display region 35 (FIG. 2(b)) of the second display unit 15. As described above, the average score is expressed by the number of leaves in the embodiment. Alternatively, the average score may be expressed by other graphics, or may be displayed by a numerical value.

The average score is calculated and displayed at predetermined time intervals over the period of the driving cycle. The average score calculated at the end of the driving cycle is stored as the total score in the memory, and the lifetime score is calculated based on the total score. As described above with reference to FIG. 15, the total score, the lifetime score, and the stage to which the lifetime score belongs are displayed on the second display unit 15 for a predetermined period (for example, six seconds) after the ignition is turned off. As described above with reference to FIG. 16, when the stage to which the lifetime score belongs is changed in the current driving cycle, a display for notifying a driver of the change of the stage to which the lifetime score belongs may be performed.

In this embodiment, the time interval at, which each score such as the accelerator score is calculated is equal to the time interval at which the average score is calculated. Alternatively, the latter may be set longer than the former (for example, the time interval at which the score is calculated is set to 100 milliseconds and the time interval at which the average score is calculated is set to one minute). In such a case, the length of the bar 39 and/or the background color 33 may be updated in synchronization with the time interval at which each score such as the accelerator score is calculated, while the score display region 35 is updated in synchronization with the time interval at which the average score is calculated. Further, in this embodiment, the total score and the lifetime score are calculated on a driving cycle basis. Alternatively, the total score and the lifetime score may be calculated on another predetermined period basis.

In this embodiment, as shown in FIG. 1, the first display unit 13 and the second display unit 15 are implemented as a display device on the instrument panel. These display units may be implemented on any display device. For example, the displays as shown in FIGS. 2(a) and 2(b) may be performed on the display apparatus 17 of FIG. 1. The displays as shown in FIGS. 15 and 16 may be performed on the display apparatus 17.

Although the specific embodiments of the invention are described above only by way of example, the invention is not limited to the embodiments. Although the embodiments partially refer to the hybrid vehicle, the invention can be applied to various vehicles such as a gasoline vehicle and a diesel vehicle.

The invention claimed is:

1. An apparatus for performing a display indicating a quality of driving operation in terms of fuel efficiency of a vehicle, comprising a control unit configured to:

detect a predetermined driving operation performed by a driver of the vehicle;
detect an operating state of the vehicle at a time when the predetermined driving operation is detected;
determine, on the basis of the detected operating state, a score that represents a quality of the detected driving operation in terms of the fuel efficiency; and
perform a display indicating the determined score,
wherein the control unit determines the score every time that the predetermined driving operation is detected, determines an integrated value or an average value of the score over every one driving cycle of the vehicle, and determines a lifetime score by performing an accumulation of the integrated value or the average value of the score every time that the respective driving cycle ends,
wherein a strictness of the determination of the score for the operating state of the vehicle increases as the value of the lifetime score increases, such that the score determined for identical operating states of equal quality decreases as the value of the lifetime score increases,
wherein the control unit displays the integrated value or the average value of the score with a number of predetermined graphics while changing the shape of the graphics according to the value of the lifetime score.

2. The apparatus according to claim 1,
wherein the control unit converts the integrated value or the average value of the score every one driving cycle into a predetermined converted value, and determines the lifetime score by accumulating the converted value,
wherein, when the integrated value or the average value of the score is greater than or equal to a predetermined value, the conversion is made such that the converted value takes a positive value,
wherein, when the integrated value or the average value of the score is less than the predetermined value, the conversion is made such that the converted value takes a negative value.

3. The apparatus according to claim 1, wherein the accumulation of the integrated value or the average value of the score is prohibited when at least one of the condition where a travel distance of the vehicle in the one driving cycle is equal to or less than a predetermined value and the condition where a maximum value of a vehicle speed in the one driving cycle is equal to or less than a predetermined value is met.

4. The apparatus according to claim 1, wherein the control unit identifies a driver of the vehicle,
wherein the accumulation of the integrated value or the average value of the score is performed for each driver.

5. The apparatus according to claim 1, wherein the predetermined driving operation is an operation for accelerating the vehicle,
wherein the operating state includes an engine rotation speed and a throttle valve opening, and
wherein the score is a value depending on a detected throttle valve opening at a detected engine rotation speed.

6. The apparatus according to claim 5, wherein the control unit is further configured to modify the score determined with respect to a predetermined driving operation, based on a vehicle speed detected at the time when the predetermined driving operation is detected, by using a vehicle speed coefficient which is predetermined to have a value depending on a vehicle speed.

7. The apparatus according to claim 1, wherein the control unit is further configured to modify the score determined with respect to a predetermined driving operation, based on a vehicle speed detected at the time when the predetermined driving operation is detected, by using a vehicle speed coefficient which is predetermined to have a value depending on a vehicle speed.

8. The apparatus according to claim 1, wherein the predetermined driving operation is an operation for decelerating the vehicle,
wherein the operating state includes a vehicle speed and a deceleration, and
wherein the score is a value depending on a detected deceleration at a detected vehicle speed.

9. The apparatus according to claim 1, wherein the control unit is further configured to modify the integrated value or the average value determined for a current driving cycle, based on a travel distance of the current driving cycle.

10. The apparatus according to claim 1, wherein the integrated value or the average value determined for every one driving cycle is limited to a predetermined maximum value.

11. An apparatus for performing a display indicating a quality of driving operation in terms of fuel efficiency of a vehicle, comprising a control unit configured to:
detect a predetermined driving operation performed by a driver of the vehicle;
detect an operating state of the vehicle at a time when the predetermined driving operation is detected;
determine, on the basis of the detected operating state, a score that represents a quality of the detected driving operation in terms of the fuel efficiency; and
perform a display indicating the determined score,
wherein the control unit determines the score every time that the predetermined driving operation is detected, determines an integrated value or an average value of the score over every one driving cycle of the vehicle, and determines a lifetime score by performing an accumulation of the integrated value or the average value of the score every time that the respective driving cycle ends,
wherein an allocation of the score to the operating state of the vehicle is changed such that the score becomes lower as the value of the lifetime score is higher,
wherein the control unit displays the integrated value or the average value of the score with a number of predetermined graphics while changing the shape of the graphics according to the value of the lifetime score,
wherein the control unit converts the integrated value or the average value of the score every one driving cycle into a predetermined converted value, and determines the lifetime score by accumulating the converted value,
wherein, when the integrated value or the average value of the score is greater than or equal to a predetermined value, the conversion is made such that the converted value takes a positive value,
wherein, when the integrated value or the average value of the score is less than the predetermined value, the conversion is made such that the converted value takes a negative value,
wherein the converted value ranges within a range defined by a positive maximum value and a negative minimum value which are predetermined so that an absolute value of the minimum value is greater than an absolute value of the maximum value.

\* \* \* \* \*